(12) United States Patent
Tung et al.

(10) Patent No.: US 7,986,755 B2
(45) Date of Patent: Jul. 26, 2011

(54) METHOD AND APPARATUS FOR CALIBRATION FOR BEAMFORMING OF MULTI-INPUT-MULTI-OUTPUT (MIMO) ORTHOGONOL FREQUENCY DIVISION MULTIPLEXING (OFDM) TRANSCEIVERS

(75) Inventors: Chien-Cheng Tung, Fremont, CA (US); Thomas Edward Pare, Jr., Mountain View, CA (US)

(73) Assignee: Ralink Technology Corporation, Jhubei (TW)

( * ) Notice: Subject to any disclaimer, the term of this patent is extended or adjusted under 35 U.S.C. 154(b) by 825 days.

(21) Appl. No.: 11/840,897

(22) Filed: Aug. 17, 2007

(65) Prior Publication Data

US 2009/0046011 A1  Feb. 19, 2009

(51) Int. Cl.
*H03D 1/04* (2006.01)
(52) U.S. Cl. ........ 375/346; 375/316; 375/347; 375/348; 375/349; 375/350; 375/351; 455/67.16; 455/278.1; 455/304
(58) Field of Classification Search .................. 375/316, 375/267, 346–351, 224; 455/561; 370/388
See application file for complete search history.

(56) References Cited

U.S. PATENT DOCUMENTS

| | | | | |
|---|---|---|---|---|
| 7,010,059 B2* | 3/2006 | Song et al. | | 375/316 |
| 7,206,354 B2* | 4/2007 | Wallace et al. | | 375/267 |
| 7,236,750 B2* | 6/2007 | Vaidyanathan et al. | | 455/84 |
| 7,280,619 B2* | 10/2007 | Nemer et al. | | 375/323 |
| 7,356,103 B2* | 4/2008 | Nishikawa | | 375/345 |
| 7,486,740 B2* | 2/2009 | Inanoglu | | 375/267 |
| 2003/0098809 A1* | 5/2003 | Lindskog et al. | | 342/174 |
| 2005/0047384 A1* | 3/2005 | Wax et al. | | 370/338 |
| 2005/0141459 A1* | 6/2005 | Li et al. | | 370/334 |
| 2005/0260949 A1* | 11/2005 | Kiss et al. | | 455/67.14 |
| 2005/0282506 A1* | 12/2005 | Azuma | | 455/115.1 |
| 2006/0114863 A1* | 6/2006 | Sanzgiri et al. | | 370/338 |
| 2007/0183479 A1* | 8/2007 | Noll et al. | | 375/132 |

OTHER PUBLICATIONS

Draft Standard for Information Technology-Telecommunications and Information Exchange Between Systems-Local and Metropolitan Area Networks-Specific Requirements, IEEE 802.11n Draft 2.0, Feb. 2007.
"On Channel Estimation in OFDM Systems," Edfors, Ove et al., VTC96, 1995, pp. 1-5, Conference Paper.
"Simplified Channel Estimation for OFDM Systems with Multiple Transmit Antennae," Li Ye, IEEE Transactions on Wireless Communications, vol. 1, No. 1, pp. 67-75, Jan. 2002.
"Digital Communication Receivers," Meyr, Heinrich et al., pp. 505-530, 1998, John Wiley and Sons, Inc., New York, NY USA.

* cited by examiner

*Primary Examiner* — Chieh M Fan
*Assistant Examiner* — Sophia Vlahos
(74) *Attorney, Agent, or Firm* — Maryam Imam; IPxLAW Group LLP

(57) ABSTRACT

An embodiment of the present invention includes a calibration system employed in a multi-input-multi-output (MIMO) system for beamforming and receiving a plurality of streams. The system includes a first calibration circuit responsive to inphase (I) and quadrature (Q) pairs of stream and operative to calibrate each I and Q pair and a second calibration circuit responsive to the calibrated I and Q pairs for all streams, wherein the first and second calibration circuits perform calibration in the time domain.

6 Claims, 20 Drawing Sheets

TABLE 1

| Ø | 1 | 2 | TEMP | 3 | 4 |
|---|---|---|---|---|---|
|   | X |   | Y |   |   |
|   | X |   | Y |   |   |
|   | X |   | Y |   |   |
|   | X |   | Y |   |   |

Ø    1    2    3    4    5

TABLE 2

FIG. 18

METHOD AND APPARATUS FOR CALIBRATION FOR BEAMFORMING OF MULTI-INPUT-MULTI-OUTPUT (MIMO) ORTHOGONOL FREQUENCY DIVISION MULTIPLEXING (OFDM) TRANSCEIVERS

BACKGROUND OF THE INVENTION

1. Field of the Invention

The present invention relates generally to the field of wireless transmitters and receivers and particularly to a method and apparatus for antenna beamforming of a multi-input-multi-output (MIMO) transmitter and receiver using orthogonal frequency division multiplexing (OFDM).

2. Description of the Prior Art

Personal devices, such as computers, phones, personal digital assistants and the like have gained wide popularity in recent years. As technology improves, these devices have become increasingly smaller in size and highly portable. In fact, wireless, portable devices of various types now commonly communicate with one another allowing users flexibility of use and facilitating data, voice and audio communication. To this end, networking of mobile or portable and wireless devices is required.

With regard to the wireless networking of personal devices, a particular modem, namely modems adapted to the up-coming IEEE 802.11n industry standard, are anticipated to be commonly employed. That is, an array of antennas is placed inside or nearby the personal device and a radio frequency (RF) semiconductor device receives signal or data through the array and an analog-to-digital converter, typically located within the personal device, converts the received signal to baseband range. Thereafter, a baseband processor is employed to process and decode the received signal to the point of extracting raw data, which may be files transferred remotely and wireless, from another personal device or similar equipment with the use of a transmitter within the transmitting PC.

To do so, pointing of the array of antennas, which is essentially multiple antennas, hence the name multi-input-multi-output (MIMO), to the desired location to maximize reception and transmission quality is an issue. For example, data or information rate throughput, signal reception and link range are improved. The latest IEEE802.11n standard currently being developed includes advanced multi-antenna techniques in order to process parallel data streams simultaneously in order to increase throughput capability, and improve link quality by "smartly" transmitting and receiving the RF signals.

There are two basic types of beamforming specified in the current draft (2.0) 802.11n standard: explicit and implicit. For explicit beamforming the receiver measures the channel between the transmitter and receiver and sends this information, called channel state information or CSI, back to the transmitter. The transmitter can then use the channel information to calculate the best transmit "paths" or "directions" for that particular client for transmitting future packets. Using the CSI in this way is sometimes referred to as beamforming. While this method provides a direct measure of the channel for beamforming, it requires CSI to be sent over the link resulting in network overhead that can lead to reduced overall throughput.

The second basic method of beamforming, implicit beamforming, does not require CSI to be sent back to the transmitter on a packet-by-packet basis. Instead the implicit method relies on the principle of channel reciprocity. Channel reciprocity assumes that the upstream and downstream channels are essentially the same (to within a transpose operation), so that the receiver can use the measured channel information to beamform packets of information back to the transmitter. In this way, no explicit CSI is required to be sent over the link, thereby eliminating network overhead. The downside of implicit beamforming is that it requires a calibration procedure between the transmitter and receiver to ensure that reciprocity is achieved. The calibration procedure requires complex coordination between the access point (AP) and clients in which large amounts of CSI are periodically exchanged. An AP is a device that is wirelessly transmitting or receiving within a network of devices.

The problem with the methods currently proposed to implement calibration for implicit beamforming is that they are cumbersome, complex and inefficient. For example, for each sub-carrier, which are 56 or 118, in the current standard, an FFT is performed, the results of which are transmitted from a personal device to another device thereby significantly adversely effecting throughout and efficiency and over-complicating the problem.

Thus, while methods are currently proposed for implicit beamforming, these methods do not eliminate the need for time consuming and complex calibration exchanges: in implicit beamforming, as defined by the IEEE802.11n D2.0 Standard, a calibration exchange is required between a transmitter and receiver pair. This is a complicated exchange that requires CSI information per sub-carrier be passed in both directions (bi-directionally) between the receiver and transmitter. The network throughput performance will degrade because this calibration step is a time-consuming process that needs to be repeated whenever channel conditions change, and requires a large amount of data to be sent over the network.

Moreover, complexity and interoperability issues arise because the implicit beamforming calibration currently requires a complicated exchange, there is a risk that solutions from different vendors will not work together due to small differences in implementation or data formatting. Further, there is a substantial processing that needs to be implemented in hardware/firmware to implement this calibration exchange.

The calibration as described in the standard will not compensate for non-linear front-end impairments, such as IQ (in-phase and quadrature) non-orthogonality.

In light of the foregoing, it is desirable to develop a transceiver for receiving and transmitting signals in conformance with the 802.11n standard with an improved calibration for implicit beamforming.

SUMMARY OF THE INVENTION

Briefly, an embodiment of the present invention includes a calibration system employed in a multi-input-multi-output (MIMO) system for beamforming and receiving a plurality of streams. The system includes a first calibration circuit responsive to inphase (I) and quadrature (Q) pairs of stream and operative to calibrate each I and Q pair and a second calibration circuit responsive to the calibrated I and Q pairs for all streams, wherein the first and second calibration circuits perform calibration in the time domain.

The foregoing and other objects, features and advantages of the present invention will be apparent from the following detailed description of the preferred embodiments which make reference to several figures of the drawing.

IN THE DRAWINGS

Figure 4:
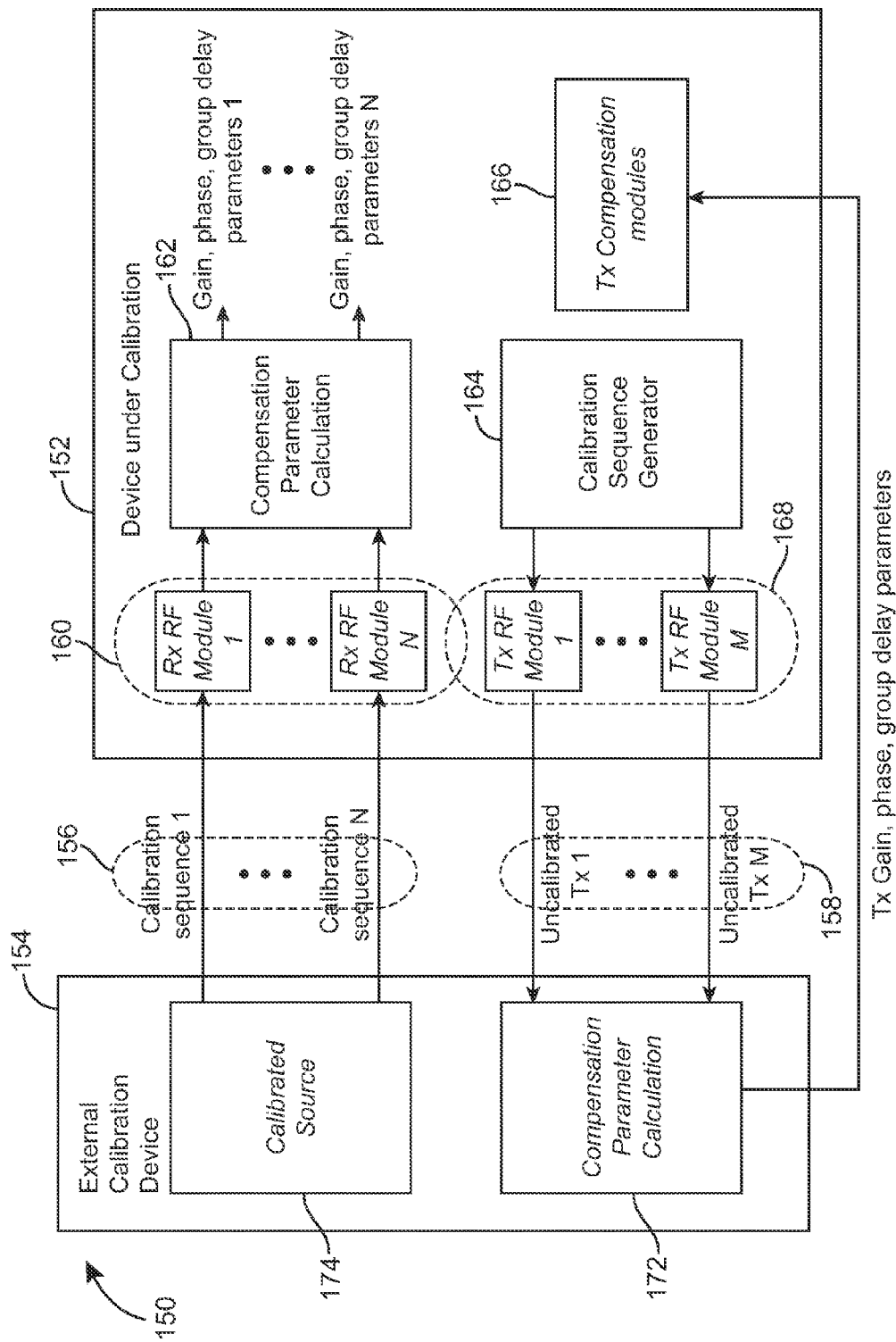

FIG. 4 shows a calibration system 150 to include a device under calibration 152 and a calibration device 154, in accordance with an embodiment of the present invention.

Figure 5:
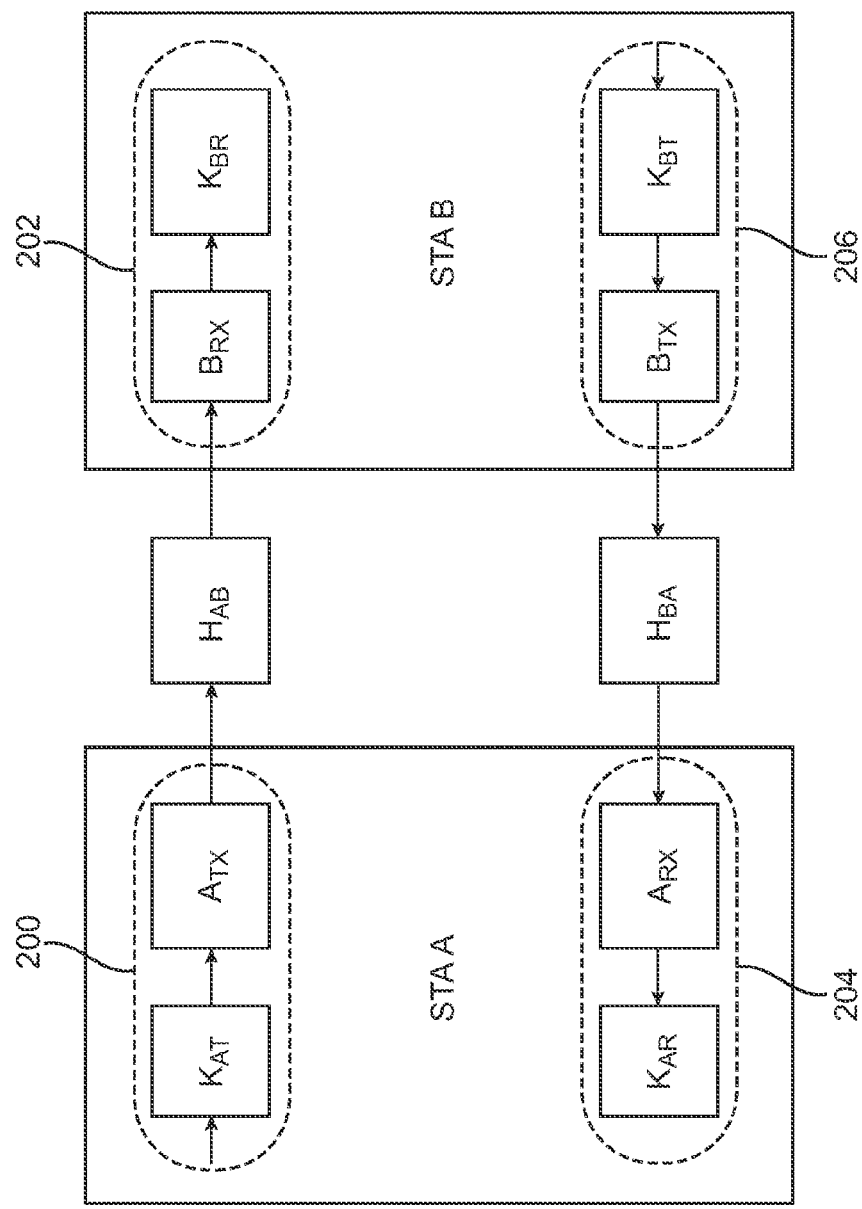

FIG. 5 shows a high level block diagram of a model of the communication of two wireless devices, Stations A and Station B.

Figure 5A:
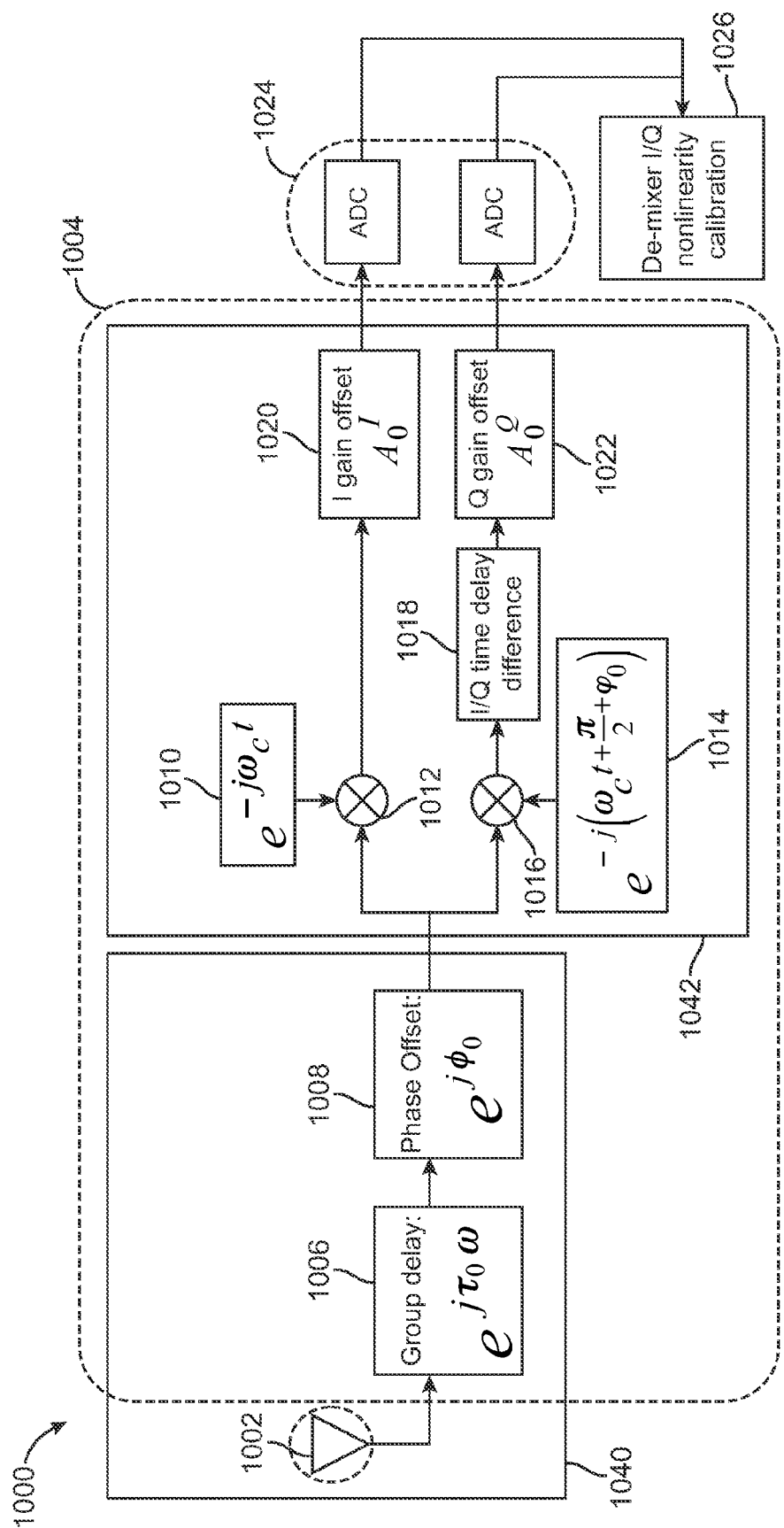
Figure 5B:
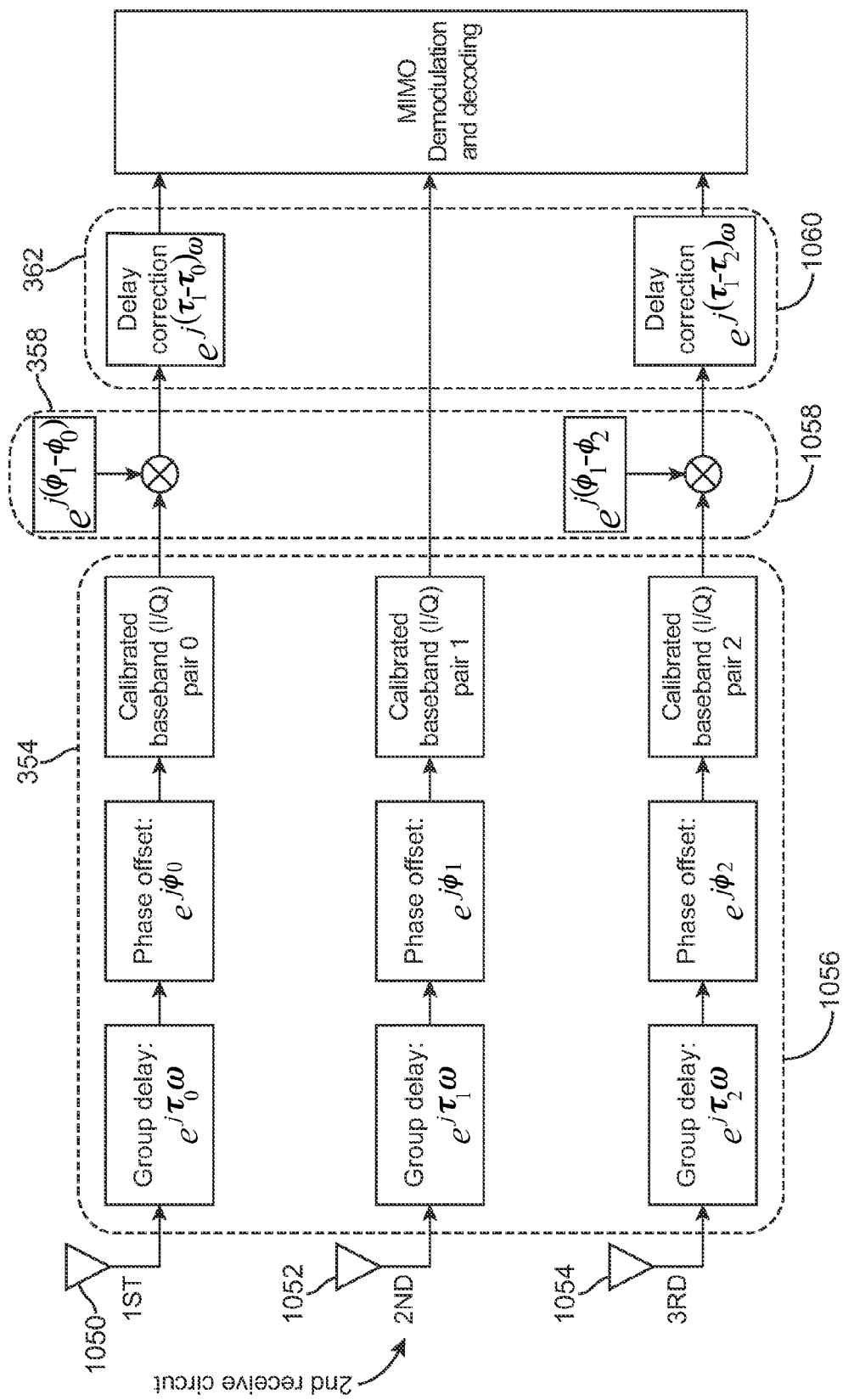

FIGS. 5(a) and 5(b) shows impairment models.

Figure 6:
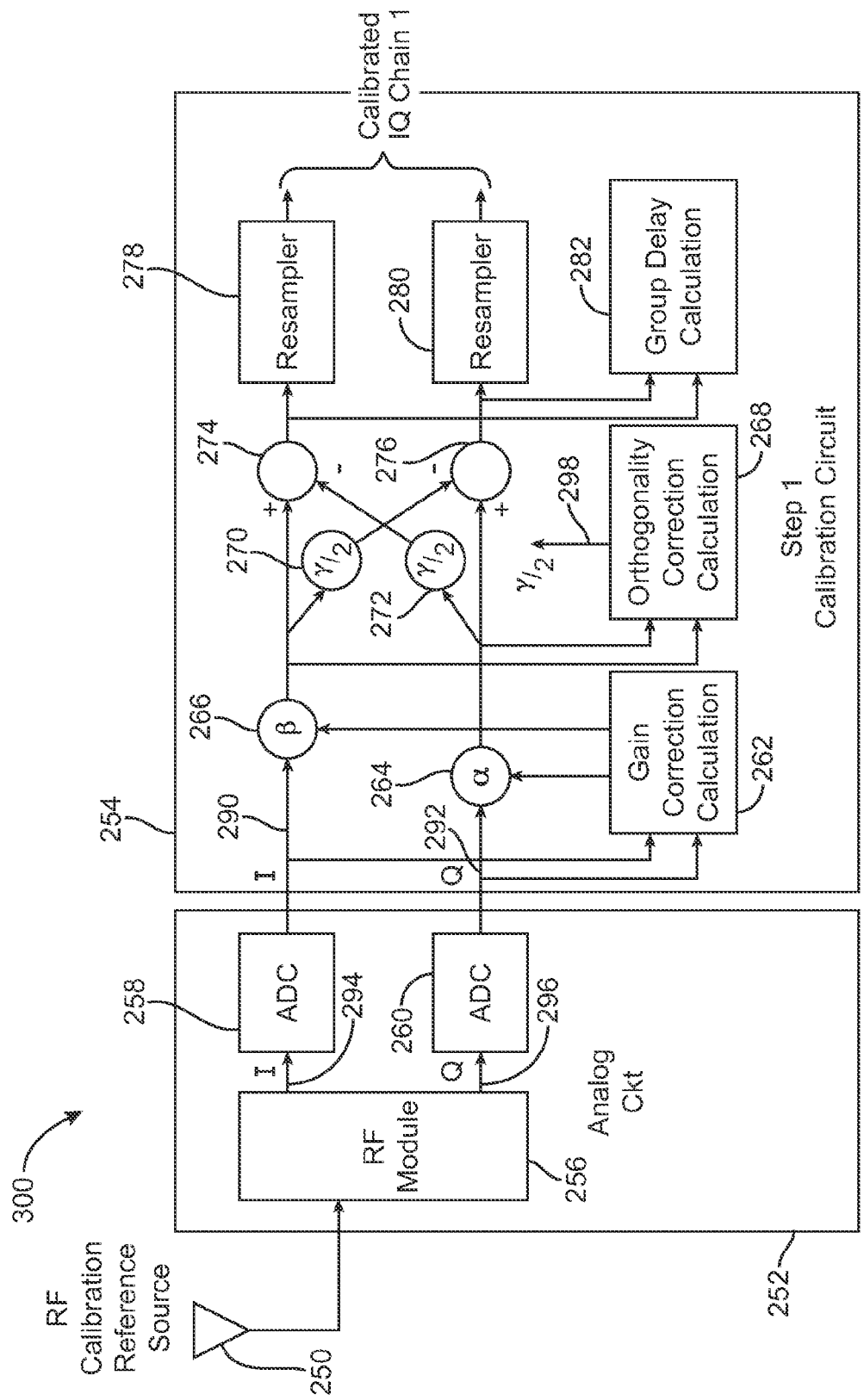

FIG. 6 shows a step 1 calibration module 300, in accordance with an embodiment of the present invention.

Figure 7:
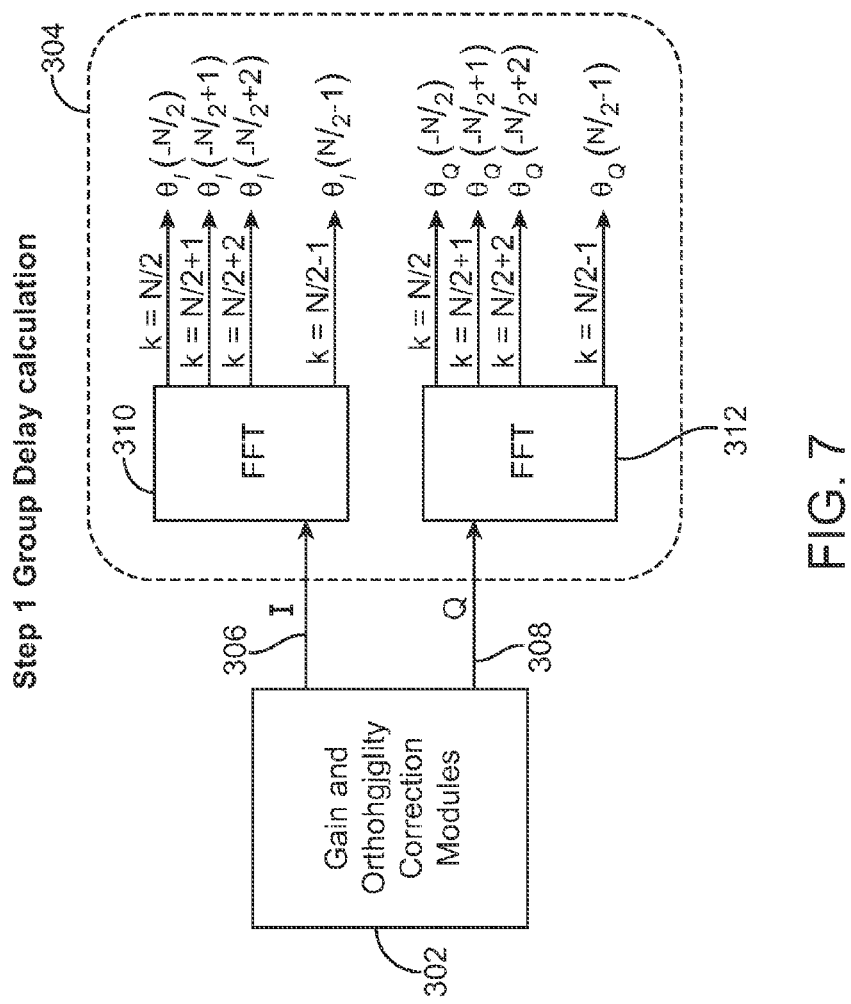

FIG. 7 shows an exemplary group delay calculation block 304, in accordance with an embodiment of the present invention.

Figure 8:
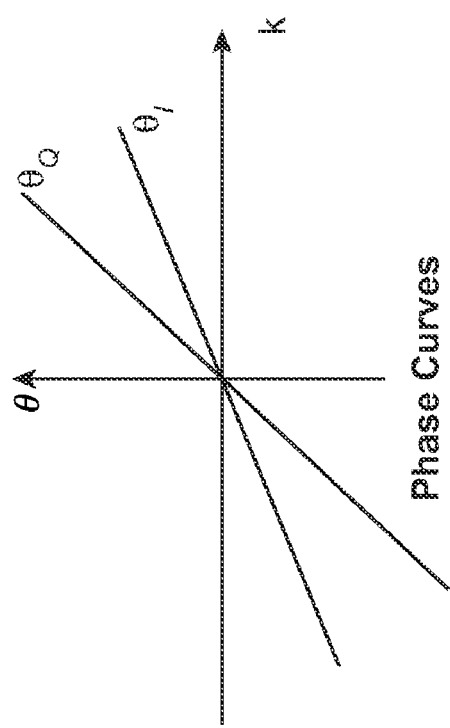

FIG. 8 shows a graph of the phase delay between I and Q with the y-axis representing theta or phase and the x-axis representing k or the number of sub-carriers summed by the circuits 274 and 276 for the first step of the calibration process.

Figure 9:
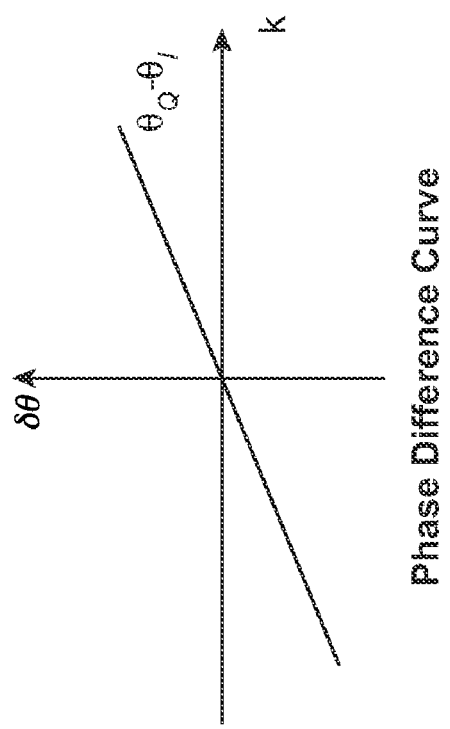

FIG. 9 shows a graph, for the first stage of the calibration process, of the difference in phases of I and Q signals.

Figure 10:
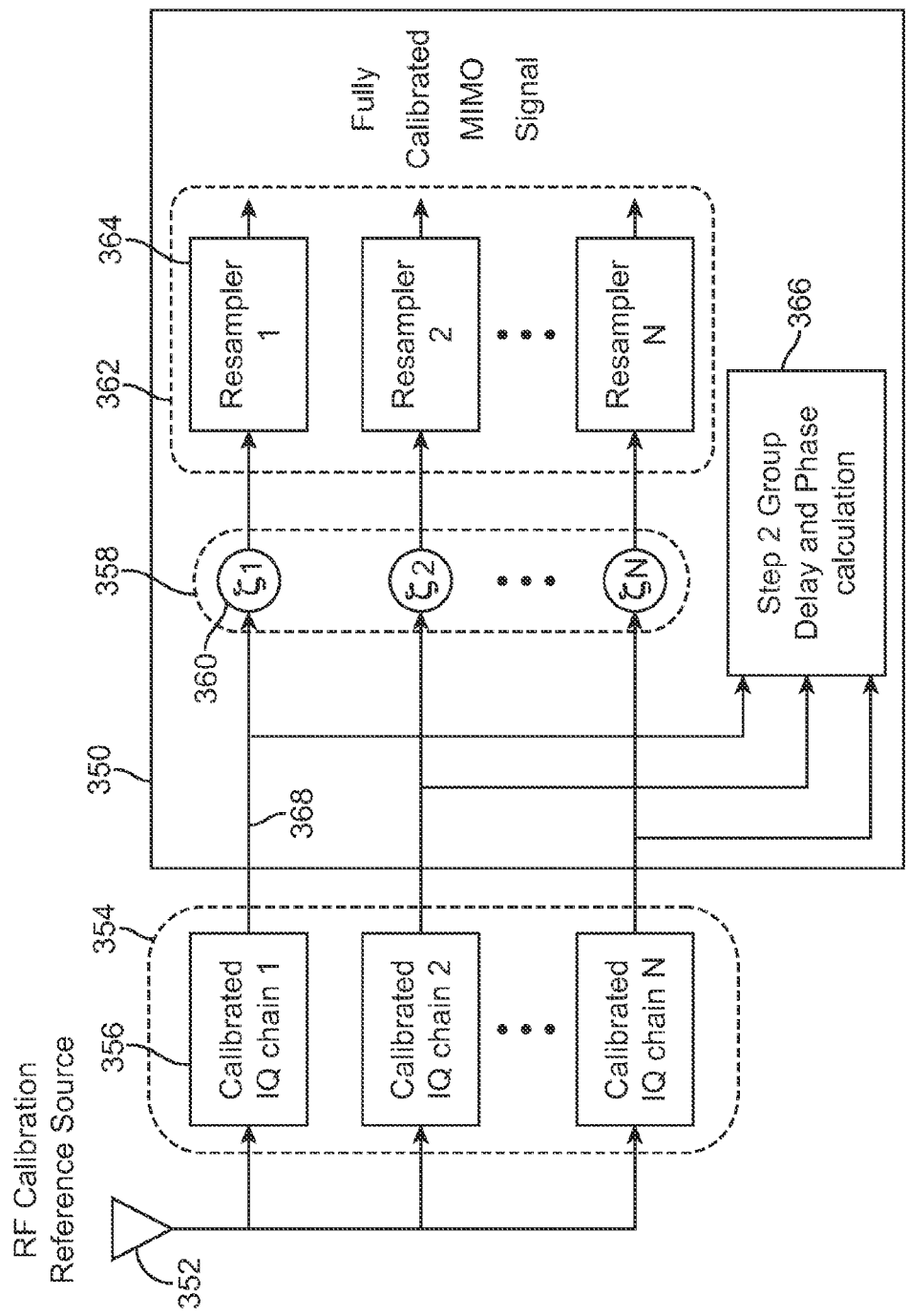

FIG. 10 shows a step 2 calibration circuit 350 coupled to a group of N calibrated IQ chains 354, which are shown to receive their input from an RF calibration reference source 352.

Figure 11:
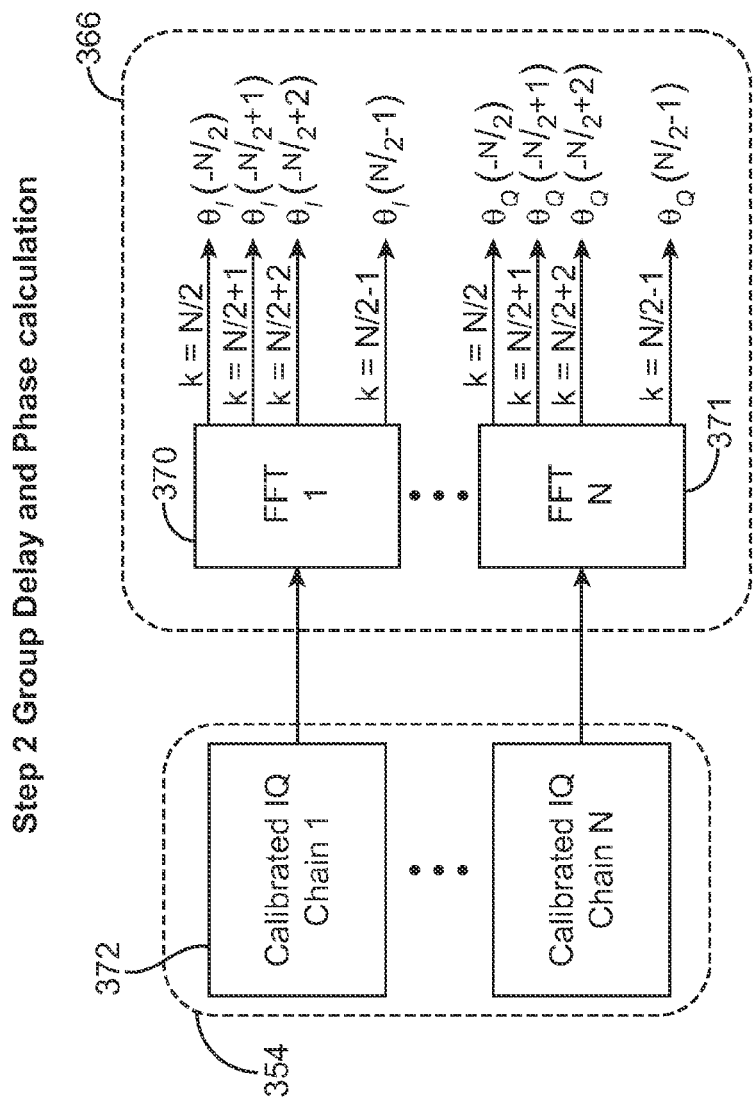

FIG. 11 shows the circuit 366 implemented using N FFT circuits, such as the FFT circuits 370 and 371.

Figure 12:
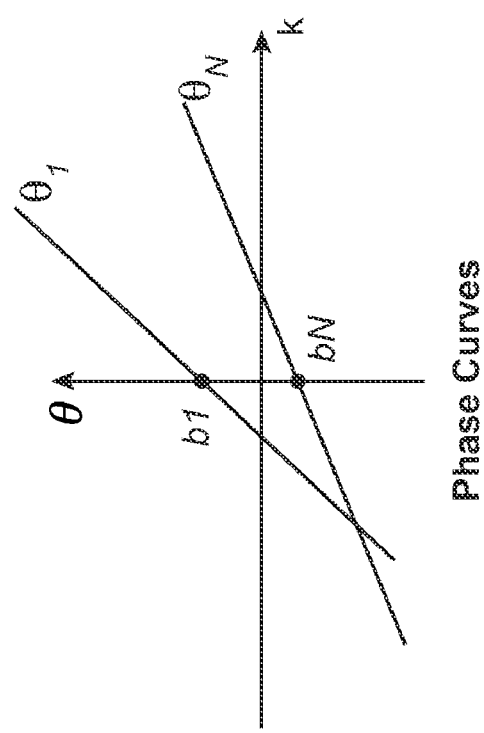

FIG. 12 shows a graph of the I and Q phases for the second part of the calibration process.

Figure 13:
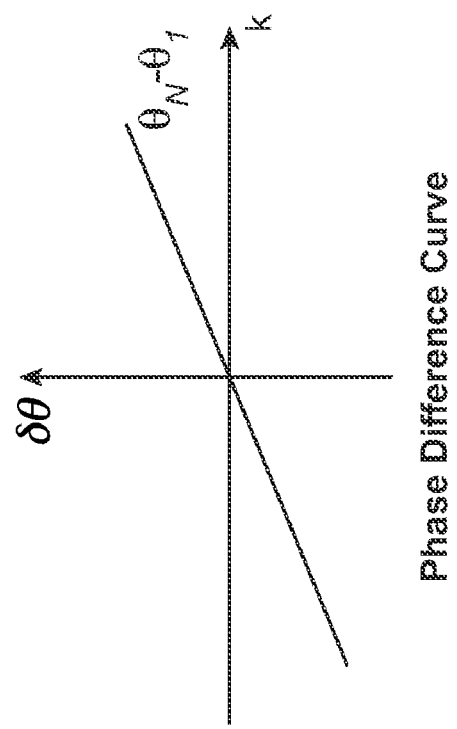

FIG. 13 shows a graph of the difference in the phase between I and Q, for the second part of the calibration process.

Figure 14:
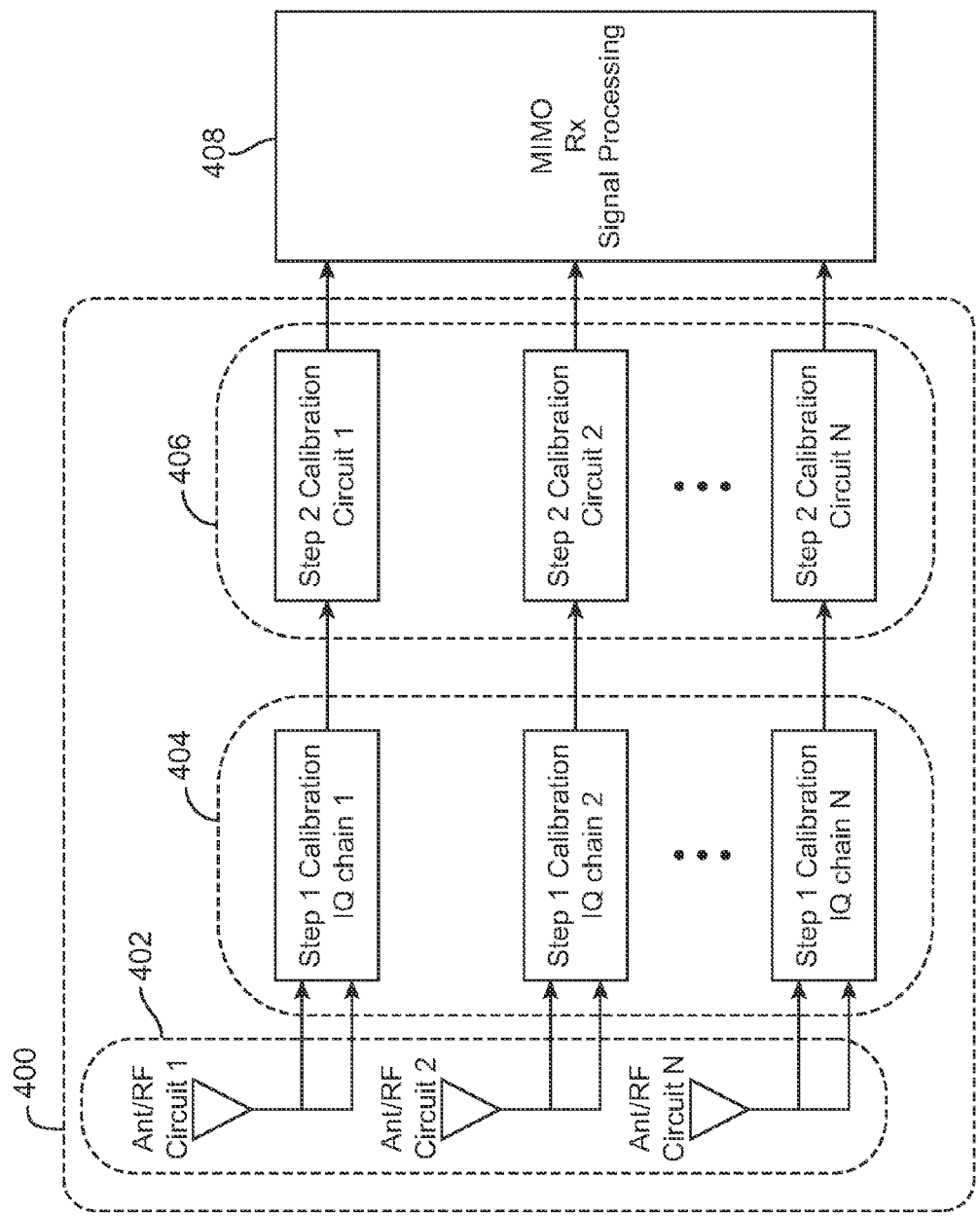

FIG. 14 shows a calibration system 400, in accordance with an embodiment of the present invention.

Figure 15:
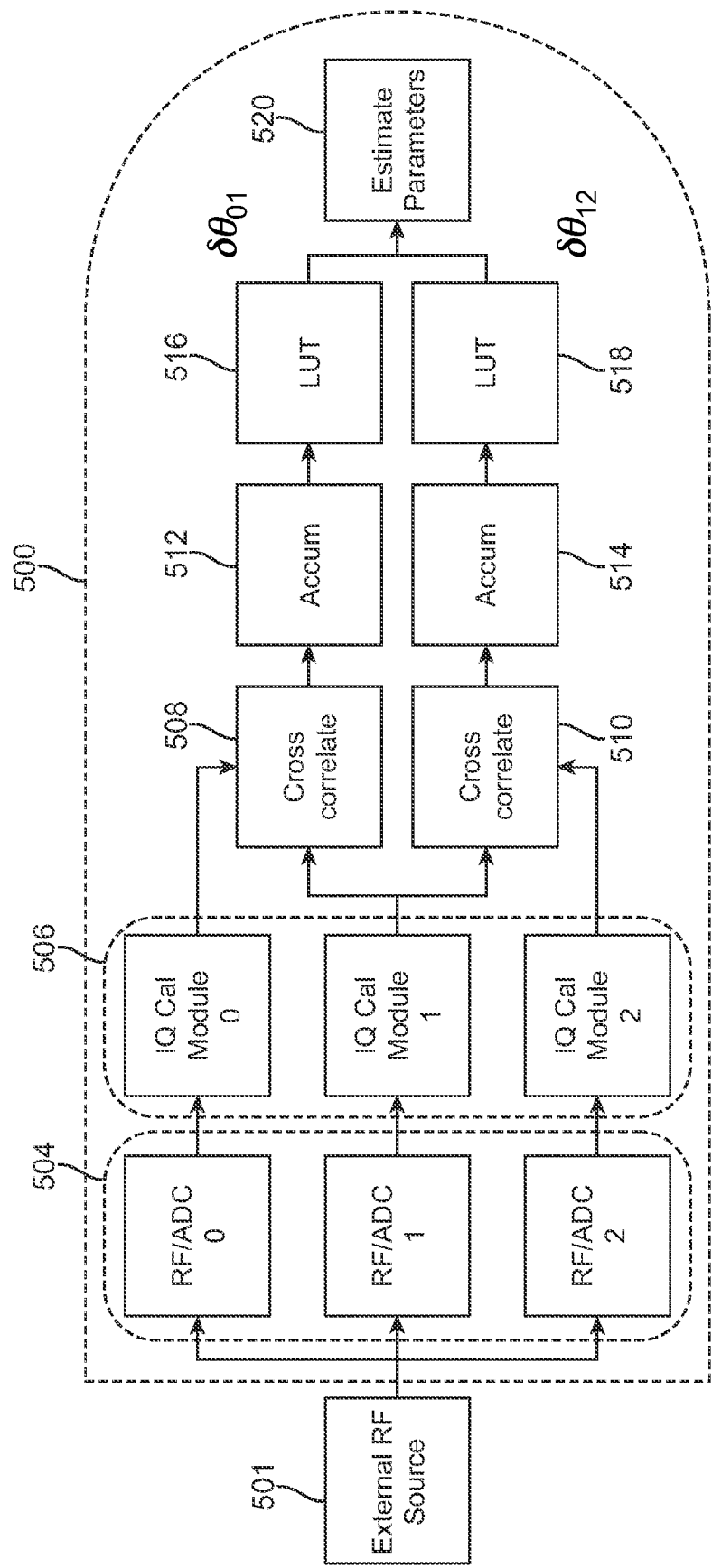

FIG. 15 shows time domain calibration for phase and group delay across receiver sub-carrier circuits.

Figure 16:
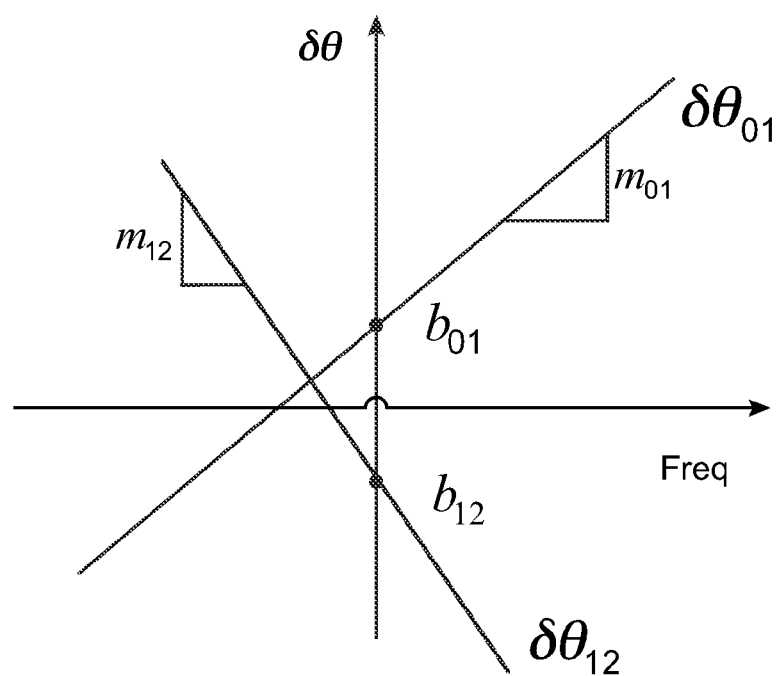

FIG. 16 shows a graph of frequency versus δθ.

Figure 17:
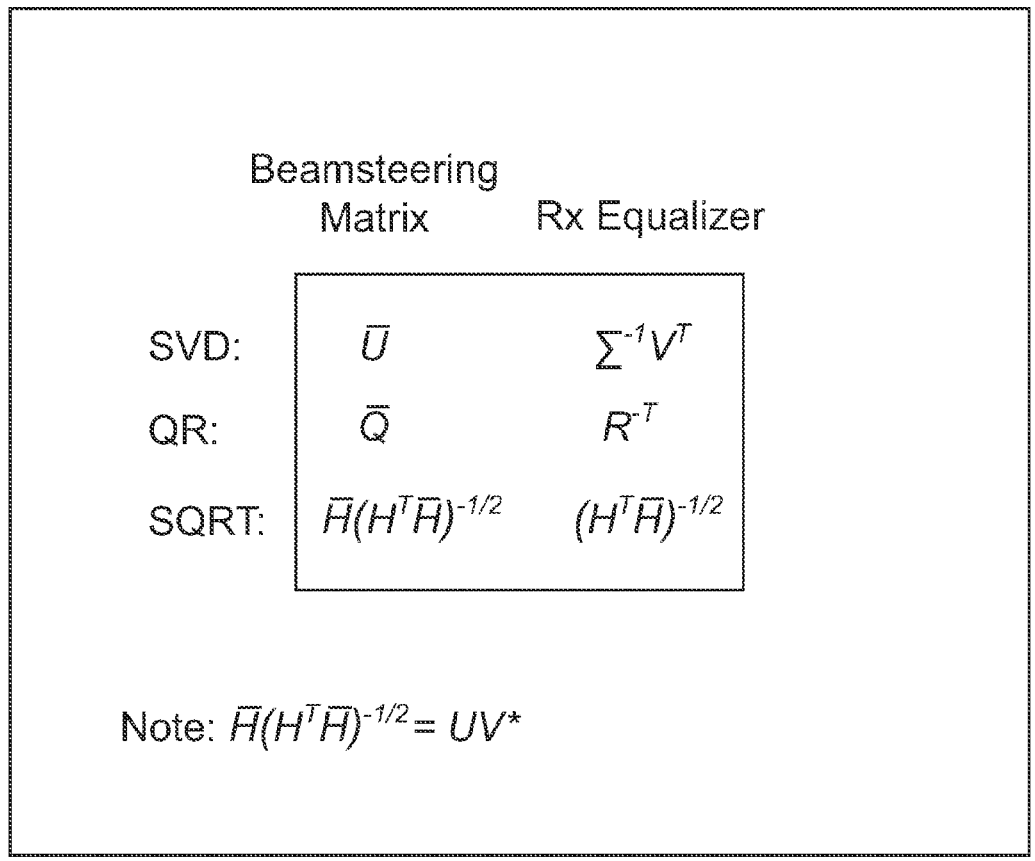

FIG. 17 shows Table 1, which shows some optional beam-steering implementations using teh implicit beamsteering method, and the decomposed matrices, of the embodiments of the present invention.

Figure 18:
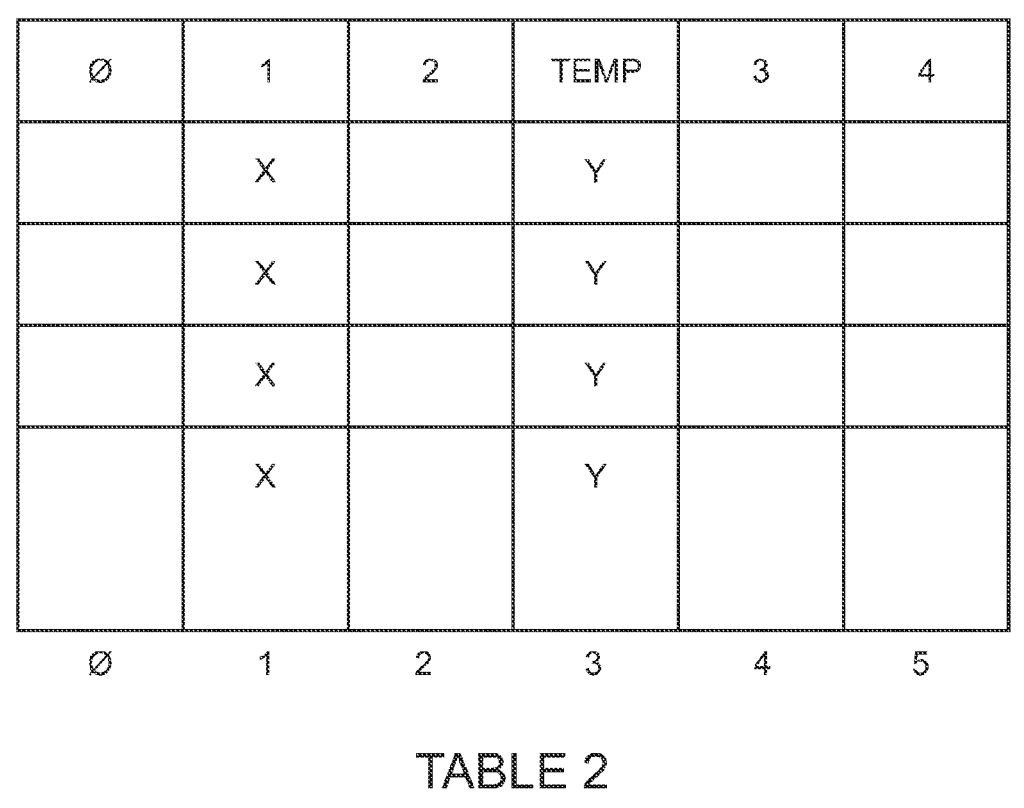

FIG. 18 shows Table 2, which shows ans example of the contents of a map stored in the local memory mapping circuit 46.

Table 1 shows some optional beamsteering implementations using the implicit beamsteering method, and the decomposed matrices, of the embodiments of the present invention.

Table 2 shows an example of the contents of a map stored in the local memory mapping circuit 46.

DETAILED DESCRIPTION OF THE PREFERRED EMBODIMENTS

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

An embodiment of the present invention provides an apparatus, such as a transceiver, and method for calibrating, in a multi-input-multi-output (MIMO) system for beamforming, to perform a two-step calibration process, in a first step, gain correction and group delay calculation is performed on pairs of in-phase (I) and quadrature (Q) transmitter and receiver chains, and in the second step, phase correction and a second group delay correction is performed on the output of the first step, to calibrate the signals across the receiver and transmitter chains. The first and second calibration circuits perform calibration in the time domain.

Figure 1:
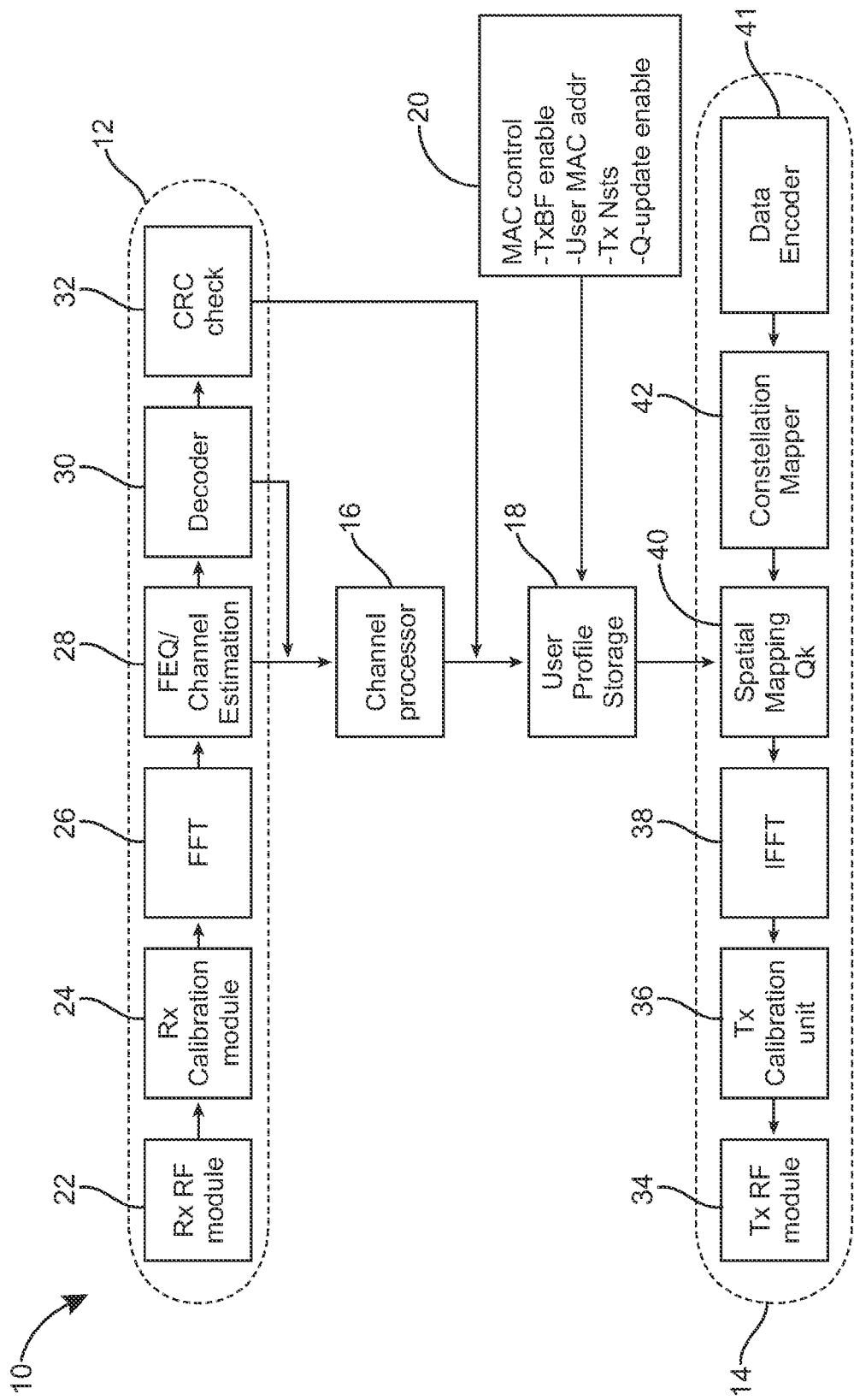
FIG. 1 shows a high-level block diagram of a universal multi-input-multi-output (MIMO) beamforming transceiver 10, in accordance with an embodiment of the present invention.

Referring now to FIG. 1, a high-level block diagram of a universal multi-input-multi-output (MIMO) transceiver beamforming system 10 is shown, in accordance with an embodiment of the present invention. The system 10 is shown to include a receiver circuit 12, a transmitter circuit 14, a channel processor 16, a user profile storage unit 18 and a multiple access control (MAC) 20, in accordance with an embodiment of the present invention. The circuits 12 and 14 are, at times, referred to as transceivers. A transceiver is for transmission and reception of information, in the form of packets, for example.

The receiver circuit 12 is shown to include a receiver radio frequency (RF) module 22 shown coupled to a receiver calibration module 24, which is, in turn, shown coupled to a fast Fourier transform (FFT) 26, which is in turn shown coupled to a frequency equalizer channel estimation circuit 28, which is shown coupled to a decoder 30, which is shown coupled to a cyclic redundancy code (CRC) check 32.

The transmitter circuit 14 is shown to include a transmitter RF module 34 shown coupled to a transmitter calibration module 36, which is shown coupled to an inverse FFT (IFFT) 38, which is shown coupled to a spatial mapping Qk 40 which is shown coupled to a constellation mapper 42. The constellation mapper 42 maps the encoded data from the data encoder 44 to symbol constellation points.

The estimation circuit 28 is further shown to couple the receiver circuit 12 to the channel processor 16 and the spatial mapping Qk 40 is further shown to couple the transmitter circuit 14 to the user profile storage unit 18. The channel processor 16 is further shown coupled to the CRC check 32 and the user profile storage unit 18 is further shown coupled to receive input from the MAC control.

The system 10 of FIG. 1 is typically used to perform OFDM in settings employing MIMO and therefore multiple antennas or antenna arrays. A key feature of the system 10 is that calibration is performed in the time domain thereby avoiding unnecessary use of valuable bandwidth. More specifically, the need for sending calibration information across the network, such as required by systems performing calibration in frequency domain and sending such information with each sub-carrier, is avoided.

In FIG. 1, the various components of the receiver circuit 12 perform various functions to demodulate received signals. The module 22 generally serves to convert an RF signal to baseband and the module 24 performs beamforming calibration. The FFT 26 performs time domain to frequency domain conversion by way of FFT and the circuit 28 generally performs channel estimation. The decoder 30 generally decodes the channel and the check 32 performs redundancy check to reduce errors. Channel estimation by the circuit 28 includes calculation of OFDM channel parameters (or matrix) for each data sub-carrier.

In FIG. 1, the various components of the transmitter circuit 14 perform various functions. The mapper 42 maps the signal to be transmitted to a known constellation and the spatial mapping Qk 40 spatially maps the output of the mapper 42. The mapper 42 receives the encoded data from the encoder 44, which generally consists of a binary convolutional encoder, puncturer and bit interleaver. The IFFT 38 generally performs an IFFT to convert the output of the spatial mapping Qk 40 from frequency domain to time domain. The module 36 generally performs calibration on the output of the IFFT 38 and the module 34 generally converts a baseband signal to RF for transmission thereof in a network of devices, an example of which will be shortly presented.

The processor 16 generally determines the best beamforming parameters for each data sub-carrier. The storage unit 18 generally stores the beamforming information for each user of the system 10. Beamforming information is based on the channel coefficients, and is generally stored in matrix form that specifies the best gain and phase directions between each transmitter and receiver antenna. The spatial mapping Qk 40 generally accepts user profile information from the unit 18 and implements beamforming for each individual data sub-carrier. The MAC control 20 generally identifies the intended destination of the packet so that the corresponding user profile information may be retrieved from the unit 18. In doing so, the MAC control 20 performs transmit beamforming enablement, user MAC addressing, transmit N stations and Q updating enablement.

The modules 24 and 36 each generally correct for RF impairments and misalignments introduced by the receiver and transmitter analog circuits, respectively, used in the system 10.

The system 10 is generally employed in a network of devices, in each device transmitting and receiving information in packet form.

Figure 1A:
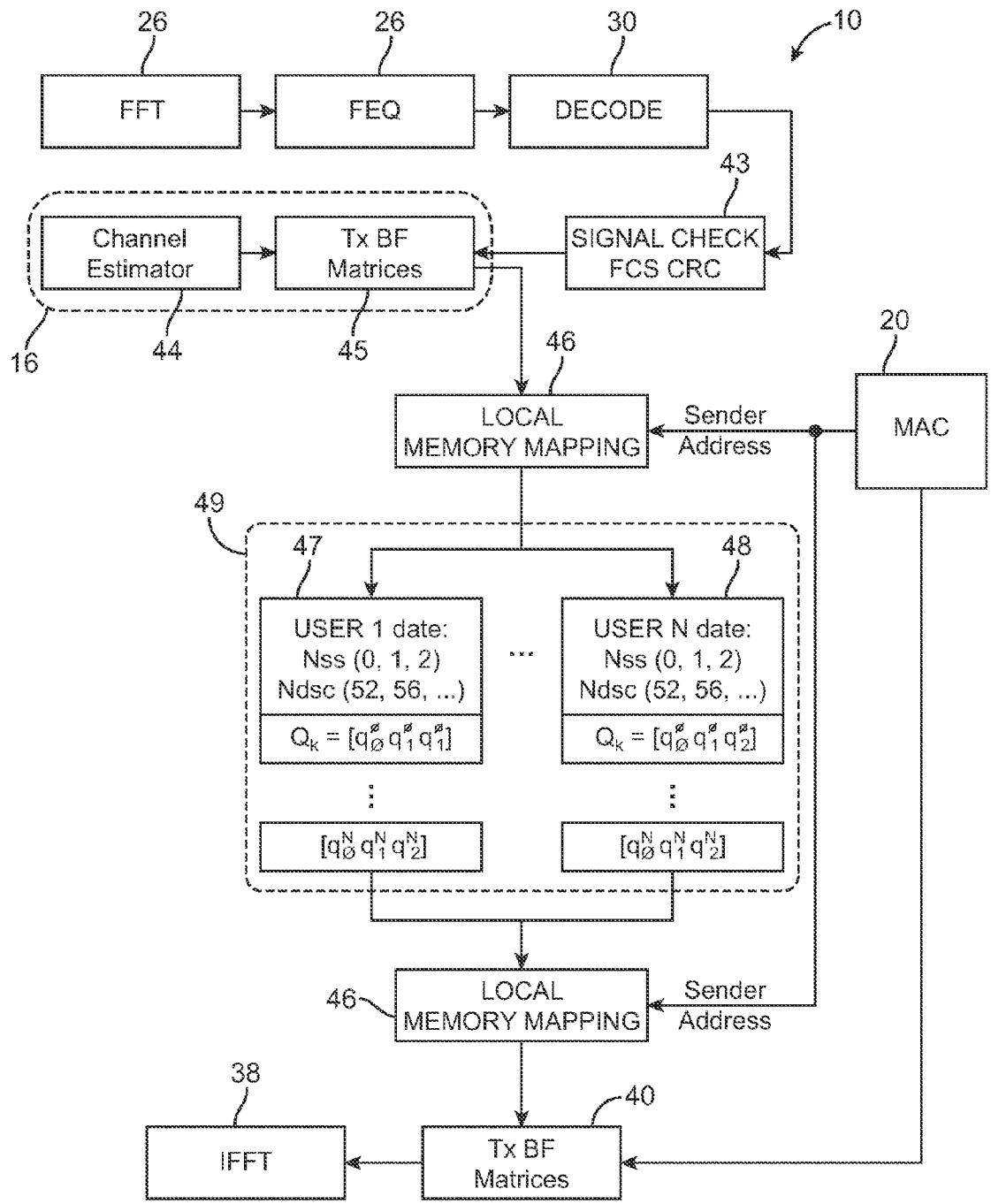
FIG. 1(a) shows a block diagram of a MIMO beamforming transceiver 10, in accordance with the present invention.

FIG. 1(a) shows a block diagram of a MIMO beamforming transceiver 10, in accordance with the present invention. In FIG. 1(a), the decoder 30 is shown coupled to a signal check FCS cyclic redundancy code (CRC) circuit 43, which is shown coupled to the processor 16. The processor 16 is shown to include a channel estimator 44 and a transmit (Tx) beamforming (BF) matrices block 45 coupled to the estimator 44. The output of the circuit 43 is shown coupled as an input to the block 45. The output of the block 45 is shown coupled to a local memory mapping circuit 46, which is shown coupled to a sub-carrier matrix storage circuit 49, which, in turn, is shown coupled to the local memory mapping circuit 46. The local memory mapping circuit 46 shown on top of the circuit 49 is physically the same circuit as the circuit 46 shown below the circuit 49. Alternatively, these are two physically different circuits. The circuit 49 is shown to include a matrix of sub-carriers (shown vertically) and streams, such as q0, q1, q2 (shown horizontally). The MAC 20 is shown to provide input to the circuit 46 shown at the top or providing input to the circuit 49 and is further shown to provide input to the spatial mapping Qk 40 and to the circuit 46 shown at the output of the circuit 49.

Verification(s) performed by the circuit 43 prevents channel information resulting from error packets from entering the storage circuit 49, thus reducing the workload of the MAC 20 and thereby causing more efficient performance.

In operation, the circuit 43 verifies that the signal (or a packet that is part of the signal) being received through the FFT 26 is an OFDM signal and if verification is successful, it uses CRC to verify the accuracy of the entire received OFDM packet. If either of these verifications fails, the signal does not make it passed the circuit 43. The circuit 46 and 49 collectively comprise the unit 18 of FIG. 1.

There is yet another verification performed when the verifications of the circuit 43 are both successful and that is the verification done by the MAC 20 as to an appropriate user being a part of the network. To do so, the MAC checks the user's identification against the user identification it maintains in a MAC table and if the user is one who belongs to the network, the system 10 proceeds to complete processing and to store the beamsteering information, otherwise, the signal is no longer processed. The MAC 20 provides the sender's address and the sendee's address, depending on whether transmission or reception is occurring, to the circuit 46.

The ability to store and retrieve beamsteering information is important to proper operation of the system 10. Because the amount of information for each user of the network is large, processing must begin before the packet itself can be validated. Thus, the packet is stored in a temporary location until the packet passes all of the required checks that validate the corresponding data for storage. One of the ways in which this is done is by using the signal check and CRC discussed hereinabove. As discussed earlier, packets may be received that pass these checks but that are not intended to be included in the network. It is the MAC 20's job to verify packets as belonging to the access point base station and alerting the baseband as to the packet validity. The MAC 20 provides the baseband, which is the blocks 24-32, 16, 18, 41, and 36-42, a unique sender identifier for each packet so that the transmit beamforming data may be properly stored. More specifically, the MAC 20 provides sender address (or user identification) for each packet to the circuit 46 and the latter performs certain steps as outlined in FIG. 1(b).

Figure 1B:
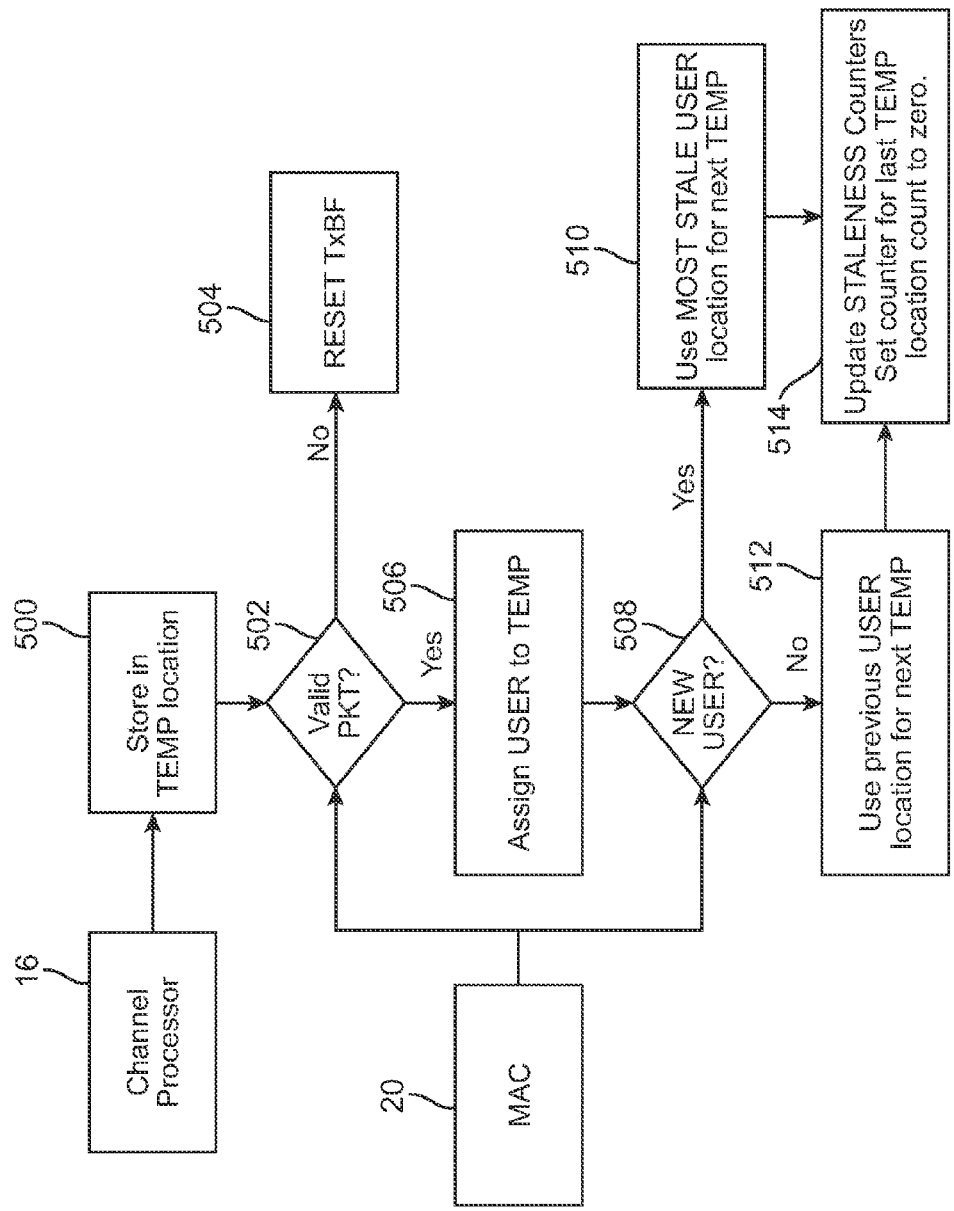
FIG. 1(b) shows a flow chart of the steps performed by the circuit 46 of FIG. 1(a).

FIG. 1(b) shows a flow chart of the steps performed by the circuit 46 of FIG. 1(a). The processor 16 initiates the beamforming computation and at step 500, this beamforming information is stored in a temporary location, within the memory circuit 49, while the circuit 43 checks the validity of the corresponding packet. Next, a determination is made at 502, as to whether or not the received packet is valid by the MAC 20. The MAC 20 does so by checking for the user being a part of the network. In the event the verification at 502 fails, the process continues to step 504 where the block 16 and 500 are reset. However, upon successful verification of the packet at 502, the process proceeds to the step 506 where the user who sent the packet is assigned to a temporary location that is maintained as a part of a user identification map, an example of which is shown in Table 2. In Table 2, the user at step 506 is assigned the temporary location in the column heading "Temp".

Next, at 508, a determination is made as to whether or not the user is a new user and if so, the process continues to step 510 where the most stale user location is determined to be use for the next temporary column. In this example, the most stale user location is '1', as indicated in Table 2. A stale user refers to the user that least recently sent a valid packet to the beamforming system 10. If at 508, a new user is not detected, the process continues to step 512 where the user's previous location is used as the next Temp location. In a typical scenario, a single user sends multiple packets consecutively causing that users beamsteering information to be alternately stored between two locations in memory, as prescribed by step 512.

After steps 510 and 512, the step 514 is performed where staleness counters pertaining to each user are updated, whereby the staleness counter for the last Temp location, i.e. the most recent user, is count to zero, and all the other user counts are incremented. The latter step can be done in one of two ways. One way is to increment the stale counter be an absolute number based on a system clock that increments accordingly and times out after a predetermined number of minutes. Time out results from inactivity for the predetermined time. Another way would be to increment the staleness counter every time a new valid packet is received, and to reset those users whose count hit a preset threshold. In this way staleness is based on the relative activity levels between the users. In either case, a user time-out causes that user's stored information to be invalid and needs to be recomputed using a new packet before beamsteering can restart for that particular user.

Figure 2:
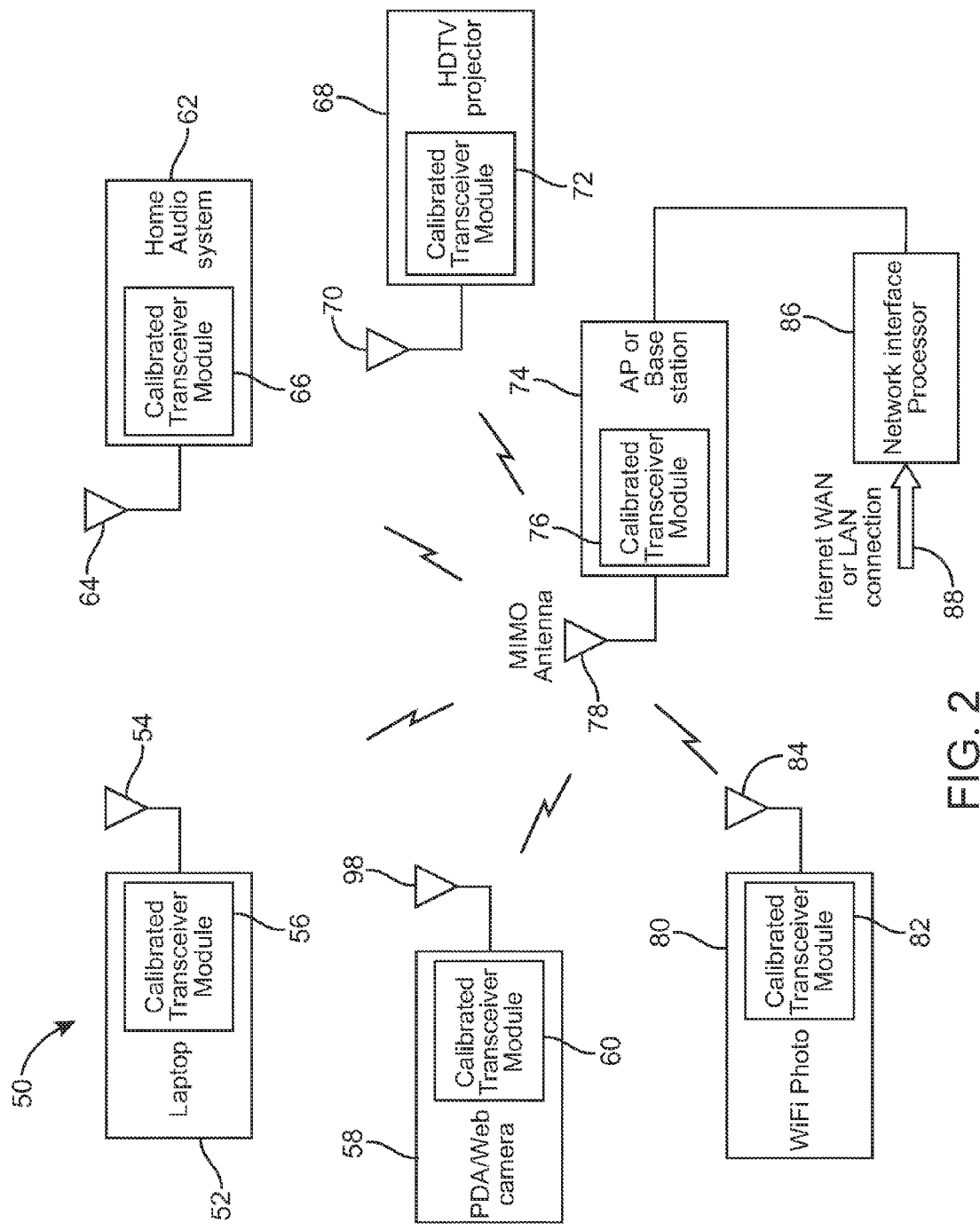
FIG. 2 shows an exemplary application of the system 10 of FIG. 1.

FIG. 2 shows an exemplary application of the system 10 of FIG. 1. More specifically, FIG. 2 shows a wireless network 50 to include a number of wireless devices 52, 58, 62, 68, and 80 wirelessly in communication with the access point 74 and therefore with each other. An example of an access point is a base station. Each of the foregoing wireless devices is shown to include a calibrated transceiver module, which is generally the system 10 of FIG. 1. A transceiver is a term used to denote a transmitter and receiver circuit.

In FIG. 2, each of the wireless devices 52, 58, 62, 68, and 80 is shown to include a calibrated transceiver module. For example, the device 52 is shown to include a calibrated transceiver module 56, the device 62 is shown to include a calibrated transceiver module 66, the device 58 is shown to include a calibrated transceiver module 60, the device 80 is shown to include a calibrated transceiver module 82, and the device 68 is shown to include a calibrated transceiver module 72.

Moreover, each of the wireless devices is shown to transmit and receive information through an antenna coupled thereto. For example, the device 52 is shown to be coupled to transmit/receive information through an antenna 54, the device 62 is shown be coupled to transmit/receive information through an antenna 64, the device 58 is shown to be coupled to transmit/receive information through an antenna 98, the device 80 is shown to be coupled to transmit/receive information through an antenna 84, and the device 68 is shown to be coupled to transmit/receive information through an antenna 70.

The access point 74 is shown to include a calibration transceiver module 76 and is further shown to be coupled to transmit/receive information through an antenna 78. The access point 74, which also communicates wirelessly, is shown coupled to a network interface 86, which, in turn, is shown to receive input from an Internet wide area network (WAN) or local area network (LAN) connection. Further, in FIG. 2, as is the current state of the art, each of the antenna, 54, 64 70, 78, 84, 98, may represent an antenna array, or multiple antenna arrays configured to simultaneously either transmit or receive data.

As is apparent in FIG. 2, multiple antennas are employed, each with a different wireless device, thus, a MIMO environment exits. Each of the devices 52, 62, 58, 68, and 80 is equipped with a locally calibrated module capable of beamforming back to the access point 74. Exemplary applications and services performed by the various wireless devices of FIG. 2 include but are not limited to, Internet browsing on a laptop or mobile device, photo sharing with a network enabled camera, telephone conversations via a "WiFi" phone, video viewing or sourcing with a High Definition TV (HDTV) or video server, or audio streaming of internet radio programs.

Figure 3:
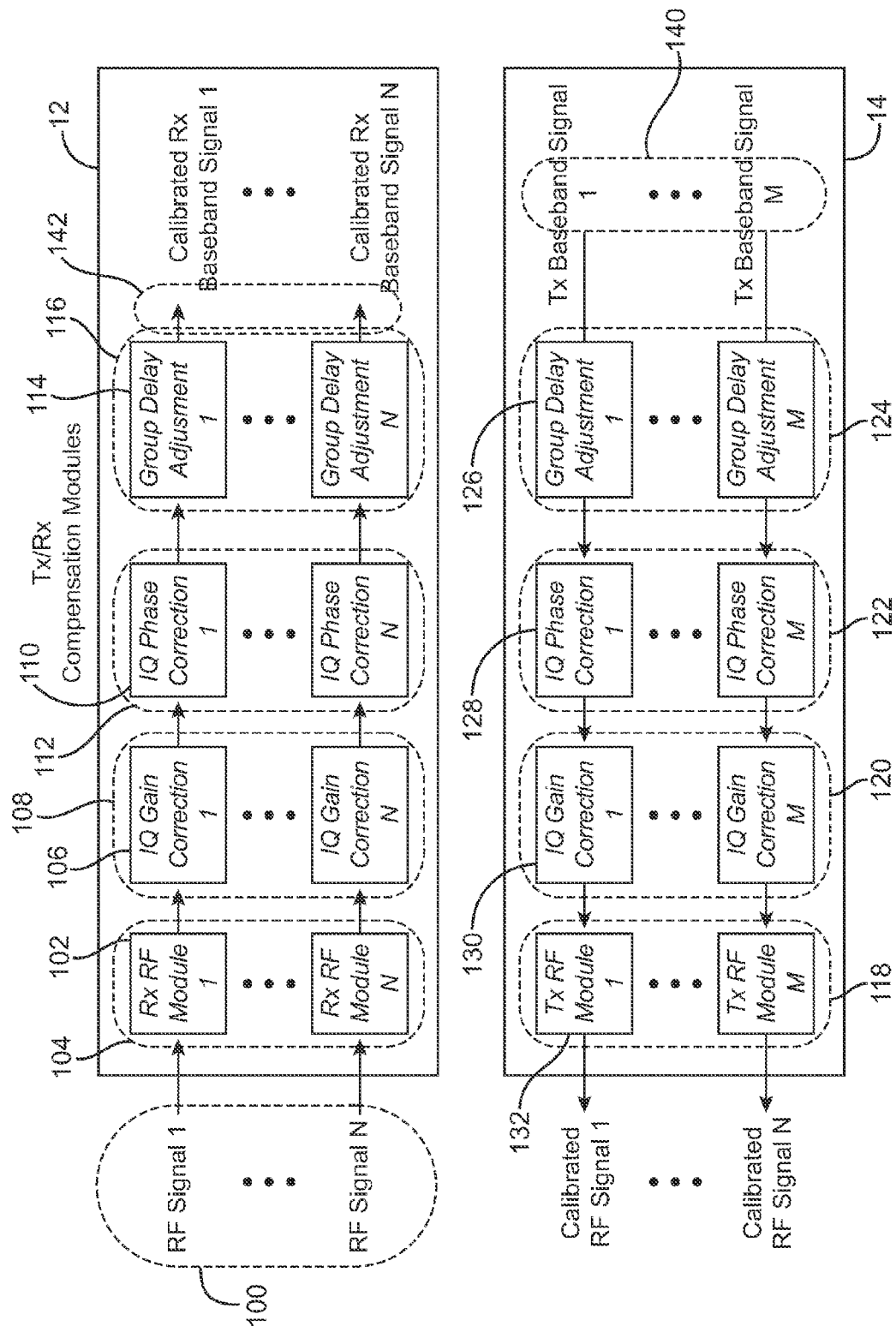
FIG. 3 shows further details of some of the components shown in FIG. 1, in accordance with an embodiment of the present invention.

FIG. 3 shows further details of some of the components shown in FIG. 1, in accordance with an embodiment of the present invention. In FIG. 3, the circuit 12 is shown to receive a group of RF signals 1 through N 100 coupled to be received by a group of receiver RF modules 1 through N 102, which are shown coupled to a group of IQ gain correction blocks 1 through N 108, which are shown coupled to a group of IQ phase correction blocks 1 through N 112, which are shown coupled to a group of group delay adjustment blocks 1 through N 116. The group of group delay adjustment blocks 116 are shown to generate calibrated receiver baseband signals 1 through N 142.

Each of the modules or blocks within the groups in the circuits 12 and 14 are coupled to another one of a different group. For example, the group of modules 104 includes a receive RF module of the modules 102, which is shown coupled to an IQ gain correction block 106 of the group of blocks 108. The block 106 is shown coupled to an IQ phase correction block 110 of the group of blocks 112 and the block 110 is shown coupled to the block 114 of the group of blocks 116, which generates a calibrated receive baseband signal 1. Similarly, the rest of the blocks or modules of the groups of the circuit 12 are coupled to their counterpart blocks or modules.

Each IQ gain correction block of the group of IQ gain correction blocks 1 through N 106 serves to correct the gain offset between the I and Q paths in the received signal. This correction is typically done by first calibrating the offset, by measuring the power on each path (using Eqs. 10, 11 below) and using a multiplier on one or both of the I and Q paths to equalize power between the I and Q signals, as referred to in Eqs. 12 and 13, and shown in FIG. 6.

In FIG. 3, the circuit 14 is shown to process a group of transmitter baseband signals 1 through M 140 coupled to be received by a group of group delay adjustment blocks 1 through M 124, which are shown coupled to a group of IQ phase correction blocks 1 through N 122, which are shown coupled to a group of IQ gain correction blocks 1 through M 120, which are shown coupled to a group of transmitter RF modules 1 through M 118.

The group of blocks 124 includes a group delay adjustment block 126, which is shown coupled to a phase correction block 128 of the group of blocks 122, which is, in turn, shown coupled to the IQ gain correction block 130 of the group of blocks 120, which is, in turn, shown coupled to the transmitter RF module 132 of the group of modules 118. Similarly, the rest of the blocks or modules of the groups of the circuit 14 are coupled to their counterpart blocks or modules. The group of modules 118 is shown to generate a group of calibrated RF signals 1 through N.

The group of modules 104 is essentially the module 22 shown in FIG. 1 and the group of modules 118 is essentially the module 34 of FIG. 1. The blocks 108, 112 and 114 are included in the module 24 of FIG. 1 and the blocks 120, 122 and 124 are included in the module 36 of FIG. 1.

The IQ phase correction blocks within the group of blocks 112 and 122, each serve to adjust phase in order to ensure each pair of I and Q channels are substantially orthogonal (90 degrees between I and Q); this block also provides the capability to equalize the overall phase between each transmitter and receiver channel.

The group delay adjustment blocks within the group of blocks 114 and 124 each serve to compensate or correct for circuit layout constraints and filter mismatch associated with the path delay for each receive path and each transmitter path, respectively (and each I/Q pair may differ). The group delay adjustment block 114 serves to correct unequal path delays in the receiver channels, while the group delay adjustment block 124 corrects for unequal group delay across transmitter circuits.

Beamforming requires precise calibration to eliminate or reduce unintended effects from MIMO transceiver analog circuits. Uneven antenna circuit traces, power amplifier variations, RF circuit mismatches across the receiver and transmitter channels tend to degrade performance. If left uncorrected in the transmitter, these imperfections will degrade performance by causing the transmitted beam to "point" away from the intended receiver. Similarly, imperfections at the receiver RF will misalign the signal entering the baseband processor and reduce the beamforming benefits. The embodiment of FIG. 3 serves to alleviate the foregoing.

Each correction module shown in FIG. 3 requires a set of parameters that are pre-determined during a calibration mode. During the calibration mode, an external device is attached to the circuits of FIG. 3, under calibration, to provide a calibrated reference signal sequence to the circuit 12. Using this signal, the former, under calibration, cycles through the received sequence to calculate the gain, phase and group delay parameters for each received chain, which is shown as module 162 in FIG. 4. A receive chain includes one RF circuit, coupled to a pair of analog to digital converters, which are coupled to the baseband digital compensation circuits 108, 112 and 114.

FIG. 4 shows a calibration system 150 to include a device under calibration 152 and a calibration device 154, in accordance with an embodiment of the present invention. In FIG. 4, the device 154 is coupled to provide N calibration sequences (signals) 156 to the device under calibration 152, N being an integer value. The device under calibration 152 is calibrated with respect to beamforming in a MIMO environment and in an exemplary embodiment are the circuits 12 and 14. The calibration sequences 156 are generated by a calibrated source block 174 within the calibration device 154.

Accordingly, the device under calibration 152 is shown to include a group of receive RF modules 1 through N 160 responsive to the calibration sequences 156 and coupled to a compensation parameter calculation 162, which is operative to generate gain, phase and group delay parameters 1 through N.

The device under calibration 152 is further shown to include a group of transmit RF modules 1 through M 168 responsive to the output of a calibration sequence generator 164 and operative to generate a group of uncalibrated transmit RF signals 1 through M 158 for coupling to a compensation parameter calculation block 172 in the calibration device 154, which is operative to generate gain, phase and group delay parameters 1 through M. The compensation parameter calculation block 172 is shown to generate transmit gain, phase and group delay parameters (compensation parameters) for real-time use by the transmit compensation modules 166 of the device under calibration 152. The module 166 collectively includes the Tx compensation blocks 120, 122 and 124.

A transceiver, as used herein, refers to a combination of receiver and transmitter or receiver and transmitter circuits.

A set of pre-stored sequences are generated during a calibration mode and provided by the calibrated source block 174 to the group of RF modules 160. Using the former, the device under calibration 152 cycles through the received sequences, i.e. the calibration sequences 1 through N 156, to calculate the gain, phase and group delay parameters for each receive chain.

The Tx analog circuits, such as the circuit 14 of FIG. 3, at least a portion of which is the transmit RF modules 1 through M 168 are calibrated by applying a reference signal from the sequence generator 164, which might be the same calibration sequence as that generated by the calibrated source block 174, and sending the output of the modules 158 to the calibration device 154 where the Tx compensation parameters can be computed, stored, and sent back to the device under calibration 152 via the coupling of the block 172 to the compensation modules 166, as shown in FIG. 4.

Examples of the device under calibration 152 are lab equipment, such as a signal generator to generate the calibration sequence. The transmitter compensation parameters can be captured with a signal analyzer and used to calculate the Tx compensation parameters. Alternatively, the calibration device can be a pre-calibrated wireless local area network (WLAN) card attached to the uncalibrated device through RF cables. The Tx calibration modules "pre-calibrate" the signal to undo the effects of the Tx RF module.

The calibration sequence and parameter calculation proceed as follows:

1. Gain calculation (performed by the blocks 108): compute average power on each receive chain. Calculate normalizing constants so that received power is equalized across all receive chain I/Q pairs.
2. Phase calculation (performed by the blocks 112): the phase correction parameters are done in two stages. First, the relative phase between each of the I and Q pairs are determined by averaging the cross-product between the received I and Q signals, with a suitable broadband reference. Next, the relative phase between each of the receive paths are determined using one or more sinusoidal reference signals (at relatively low frequency) on each receive path and measuring the phase between the received signals.
3. Finally, the group delay (performed by the blocks 116) between the I and Q and each of the receive channels can be determined. A channel refers to any of the 1 through N channels or signals. One method to measure group delay that is suitable for an OFDM signal is to measure the phase of a reference sinusoid at several frequency points, preferably evenly spaced across the entire signal band. For example, in the case where there are 56, numbered −28 to 28, subcarriers specified in the 802.11n standard for 20 MHz bandwidth transmissions, the reference sequence can consist of 8 reference tones, spaced 7 subcarriers apart, using the set of sub-carriers: (−28,−21,−14,−7,7,14,21,28). The phase on each of the subcarriers is measured and stored. The linear phase (or slope) across the ordered tones provides a measure of the group delay on that particular channel. The sub-channel with the largest group delay determines how much compensation is required on the other channels. That is, the other channels are delayed in order to match the sub-channel (I or Q) having the largest delay. The delay for each sub-channel is converted from phase slope to fractions of a sample delay. The time delay compensation can then be implemented in the time domain using a resampler.

Calibration of the front end of the transceiver (both Rx and Tx) enables subsequent beamsteering to be accurate. In particular, calibration ensures that channel reciprocity is substantially maintained. Channel reciprocity refers to, within a constant, the mathematical model of the upstream channel, $H_{US}$, is the transpose of the mathematical model of the downstream channel:

$$H_{US} = \alpha_{REC}(H_{DS})^T \quad \text{Eq (1)}$$

Where $H_{US}$ is the mathematical model of the upstream channel, $H_{DS}$ is the mathematical model of the downstream channel and $\alpha_{REC}$ is the reciprocity constant and $(\ )^T$ represents the transpose of $(\ )$. $\alpha_{REC}$ may be any arbitrary constant value and is the reciprocity constant. Upstream and downstream channels refer to the direction in which information is being transmitted. This condition is discussed in detail in the IEEE802.11n Draft 2.0 Standard. Reciprocity is guaranteed if both ends of the link are calibrated as discussed above.

The beamsteering parameters are calculated for each subcarrier of an OFDM symbol. This is generally a two-step process: first the channel is estimated for each subcarrier. The resulting estimate is a complex valued matrix with row dimension M equal to the number of antenna, and number of columns N equal to the number of data streams (typically N<M). Next, the channel matrix estimate is decomposed, using numerical techniques such as the QR decomposition, or singular value decomposition (SVD). The decomposition provides the steering information for the transmitter to "pre-equalize" the data packet so that the signal at the receiver has the highest SNR (say for a one-stream packet), or for example, has effectively "decoupled" data streams when multiple streams are sent.

The decompositions for a given channel H can be written as $$H = U\Sigma V^* \quad \text{Eq. (2)}$$

when using the singular value decomposition (SVD), or $$H = QR \quad \text{Eq. (3)}$$

for the QR decomposition. H represents the channel matrix and $\Sigma$ is the diagonal singular matrix. In these cases the matrices Q, U, and V are unitary matrices, which means that the magnitude of the eigenvalues are all "one", and that they are perfectly invertible by the Hermitian transpose. That is, $U^*U=I$, $Q^*Q=I$, etc. The important point is that these matrices, derived from the channel estimates, can be used to beamsteer each subcarrier. Using the implicit beamsteering method, and the decomposed matrices, some optional beamsteering implementations are provided in Table 1. In Table 1, the barred matrices are the conjugate values of the original matrix.

The conjugates are required when implementing implicit beamsteering.

The process whereby the beamsteering matrices are calculated based on a received packet, stored, and subsequently retrieved for beamsteering transmitted packets is ultimately controlled by a medium access control (MAC) layer module, as shown in FIG. 1. When the packet is received, the channel estimation and decomposition (QR, SVD, etc) begins, and continues if the packet is found to have a valid signal field, and CRC. The packet then needs to be identified with a valid and unique user MAC address so that the CSI can be stored in the appropriate location for subsequent retrieval. The MAC layer processing determines the user address and maps this to a memory location in the PHY layer. In addition, the MAC level module will determine whether or not transmit beamsteering is to be enabled for a particular user.

The foregoing embodiments of the present invention serve to eliminate the need for time consuming and complex calibration exchanges. Thereby improving network throughput performance which would otherwise be adversely affected by a time-consuming process that needs to be repeated whenever channel conditions change, and requires a large amount of data to be sent over the network. Moreover, complexity and interoperability issues are resolved thereby eliminating the risk that solutions from different vendors will not work together due to small differences in implementation or data formatting. Further, the need for substantial processing to implement calibration exchange is avoided.

The calibration as described in the standard will not compensate for non-linear front-end impairments, such as IQ non-orthogonality, whereas, the embodiments of the present invention do. The performance benefits achieved by the embodiments of the present invention for beamforming, for a typical channel condition (IEEE model B: small home/office environment), a 3×3 MIMO transceiver with implicit beamforming, with two-ended calibration circuits are improved between 4-7 dB.

Performance improvements of the various embodiments of the present invention, using beamsteering methods or "smart antennas" essentially maximize the performance of the antenna array. Ultimately, by maximizing the antenna performance, four antennas may be reduced to three, or three reduced to two and so on. Thus, the foregoing beamsteering system may be used to alleviate the problem of complexity (cost) and high power consumption associated with MIMO WLAN systems.

Some of the benefits of the foregoing embodiments of the present invention include simplicity of implementation, no complex calibration exchanges, low network overhead, since no CSI information needs to be transmitted between transceivers, no interoperability risks, since solution is inherently one sided and achieving approximately between 4 and 7 dB of performance improvement.

In addition, the performance gains achievable using beamforming can be used to eliminate one or more Rx/Tx channels, so that lower power and lower cost solutions are possible in future products.

Additional details regarding the calibration method and apparatus of the various embodiments of the present invention are now presented with respect to figures and corresponding equations. First, some equations are presented by way of background.

The notations $K_A$, $A_{TX}$ and $A_{RX}$ are mathematical representations of the behavior exhibited by a wireless device, such as that shown in FIG. 2. Similarly, the notations $B_{RX}$, $K_B$ and $B_{TX}$ are mathematical representations of the behavior exhibited by Station B. The channel, on the receiver side, is represented by $H_{AB}$ and on the transmit side is represented by $H_{BA}$. Each of the foregoing notations indicates a matrix of values because there are N streams of data (or signal), as previously indicated. Ideally, $H_{BA}$ is the transpose of $H_{AB}$ in the case where the former is an exact transpose of the latter. This is assumed in the following equations. $K_A$ and $K_B$ are calibration matrices and determined during calibration exchange to ensure channel reciprocity.

The calibration for implicit beamforming is redrawn from the Draft 2.0 IEEE802.11n Standard. The matrices $A_{TX}$, $A_{RX}$, $B_{TX}$ and $B_{RX}$ are "impairments" or imperfections in the analog/RF portion of the transceiver that must be calibrated, or corrected. The correction matrices $K_A$ and $K_B$ are typically implemented in baseband for each subcarrier in the orthogonal frequency domain multiplexing (OFDM) spectrum (i.e, 56 or 114 subcarriers, depending on channel bandwidth). According to the standard, correction matrices are determined during a "calibration exchange", whereby the measured channel state information (CSI) with the imperfections is sent between station (STA) A and station (STA) B. With upstream and downstream CSI available at both links, the channel reciprocity condition is used to determine the correction matrices:

$$B_{RX} H_{AB} A_{TX} K_A = (A_{RX} H_{BA} B_{TX} K_B)^T \quad \text{Eq. (4)}$$

Where $B_{RX}$ represents receiver impairment matrix at station B, $H_{AB}$ represents the channel from A to B, $A_{TX}$ represents transmitter impairment matrix at station A, $K_A$ represents the calibration matrix at STA A, $A_{RX}$ represents receiver impairment at receiver A, $H_{BA}$ represents channel from B to A, $B_{TX}$ represents impairment at transmitter B and $K_B$ represents calibration at transmitter B.

As given in the standard, channel reciprocity implies that:

$$K_A = B_{TX}^{-1} B_{RX}^T \text{ and } K_B = A_{TX}^{-1} A_{RX}^T \quad \text{Eq. (5)}$$

Where '−1' represents an inverse operation, thus $B_{TX}^{-1}$ is the inverse of $B_{TX}$.

The information regarding the impairments need be broadcast per subcarrier. This aspect of the standard represents large overhead, implementation complexity and possible interoperability problems resolved by the embodiments of the present invention.

FIG. 5 shows a high level block diagram of a model of the communication of two wireless devices, Stations A and Station B, in accordance with an embodiment of the present invention. In FIG. 5, the corrections to compensate for impairments are done at both the Rx and Tx sides of the transceiver. The transmit circuit is modeled at 200 in Station A and the receive circuit is modeled at 202 in Station B. The transmit circuit of Station (STA) B is modeled at 206 and the receive circuit of Station (STA) A is modeled at 204. Specifically, at STA A, the matrix $K_{AT}$, which is shown as the block $K_{AT}$, in FIG. 5, compensates for the impairment $A_{TX}$, and the matrix $K_{AR}$, which is shown as $K_{AR}$ in FIG. 5, compensates for the impairment $A_{RX}$; while at STA B, the matrix $K_{BR}$, which is shown as the block $K_{BR}$, in FIG. 5, compensates for the impairment $B_{RX}$, and the matrix $K_{BT}$, which is shown as the block $K_{BT}$, in FIG. 5, compensates for the impairment $B_{TX}$. The new calibrated beamforming approach can be thought of as a local solution whereby:

$$K_{AT} = a_{AT} A_{TX}^{-1}, K_{AR} = b_{AR} A_{RX}^{-1} \text{ and } K_{BR} = a_{BR} B_{RX}^{-1},$$
$$K_{BT} = b_{BT} B_{TX}^{-1} \quad \text{Eq. (6)}$$

Where $a_{AT}$, $a_{BR}$, $b_{AR}$ and $b_{BT}$ each represent arbitrary constants that are defined during the calibration procedure, in a manner similar to that which is discussed with respect to equations below. In addition, calibration is performed in the time domain on each of the Rx and Tx channels, whereas proposed approaches operate in the frequency domain on each of the individual subcarriers. In the embodiments of the present invention, calibration modules are calibrated locally at the transceiver using a built-in calibration method, and by pairing the transceiver with an external reference source, as described above. Also, in this way, no channel information needs to be estimated over the air, thus, no degradation of the calibration process is realized.

Referring to FIG. 5, the mathematical model of the downstream channel is shown by the upper sequence of blocks connected by arrows from STA A to STA B. That is, in matrix form, the downstream channel is represented by:

$$H_{DS} = K_{BR} B_{RX} H_{AB} A_{TX} K_{AT} \quad \text{Eq (6a)}$$

Similarly, the upstream channel in FIG. 5 is depicted by the lower sequence of blocks, with connecting arrows pointing from right to left. This is similarly represented by:

$$H_{US} = K_{AR} A_{RX} H_{BA} B_{TX} K_{BT} \quad \text{Eq. (6b)}$$

With the calibration matrices defined in Eq. (6), the downstream and upstream channels become:

$$H_{DS} = a_{BR} a_{AT} H_{AB} \quad \text{Eq. (7a)}$$

and $$H_{US} = b_{AR} b_{BT} H_{BA}, \quad \text{Eq. (7b)}$$

respectively.

Since the ideal channel satisfies the property $H_{BA} = (H_{AB})^T$, the following condition results, by substitution using Eqs (7a) and 7(b) into $H_{BA} = (H_{AB})^T$, which then gives:

$$\frac{H_{US}}{b_{AR} b_{BT}} = \left(\frac{H_{DS}}{a_{BR} a_{AT}}\right)^T. \quad \text{Eq. (8a)}$$

Rearranging this equation yields the equality:

$$H_{US} = \frac{b_{AR} b_{BT}}{a_{BR} a_{AT}} (H_{DS})^T. \quad \text{Eq. (8b)}$$

Eq. (8b) is the reciprocity condition Eq. (1), where the reciprocity constant (from Eq. (1)) is given as:

$$\alpha_{REC} = \frac{b_{AR} b_{BT}}{a_{AT} a_{BR}} \quad \text{Eq. (9)}$$

The calibration method and apparatus of the various embodiments of the present invention, which is performed in the time domain, is perhaps described as a two step process. The first step involves per-stream calibration, and the second step is across-streams. The streams refer to both receive and transmit streams. A stream, or receiver chain, as used herein, refers to the hardware from each receiver RF circuit, AD converter, and its associated baseband calibration and filtering modules. Similarly, a transmit stream, or chain refers to the associated baseband calibration/filtering modules, DA convertor and transmitter RF circuit and associated transmitter antenna. The terms "stream" and "chain" are used synonymously herein. The two-step process for the receive portion of the calibration will be described with the understanding that the transmit portion follows the same calibration (or measurement) process.

This two step process is based on a RF/analog impairment model, shown in FIG. 5(a), and is used to model the impairments experienced by the streams undergoing the calibration of FIG. 3.

In FIG. 5(a), an RF antenna and demixer circuit impairment model 1000 is shown to include an RF antenna 1002 coupled to a demixer circuit impairment model 1004. The model 1004 is essentially a mathematical model or representation of the modules 102. In the model 1004, the impairments are partitioned into two stages that capture imperfections to be calibrated and compensated for in order to perform beamforming, as discussed above.

The first stage is shown in FIG. 5(a) is the antenna 1002 and associated RF circuits (not shown), while the second stage, i.e. the model 1004, involves the "demixer" stage that generally converts the RF signal to baseband. The RF/antenna circuit generally includes a time delay (or group delay) 1006 that differ for each antenna, and can be modeled as time delay of the form $e^{j\tau_0 \omega}$ where $\tau$ is the delay constant and $\tau_0$ refers to the $\tau$ of the circuit of the first stream of N streams, N being an integer value and $\omega$ represents the frequency.

Phase delay (or offset) circuit 1008 varies linearly with frequency $\omega$ and is modeled as $e^{j\phi_0}$ where $\phi$ is phase and $\phi_0$ is the phase of the circuit of the first stream of N streams. Additionally, each antenna circuit will have arbitrary phase $\phi$.

The demixer circuit impairments are modeled as non-orthogonality, represented by $\phi$, time (or group) delay difference and gain difference $A^I/A^Q$ introduced in producing inphase and quadrature components of the baseband signal, as shown in FIG. 5(a). $A^I$ is the gain of the I channel and $A^Q$ is the gain of the Q channel. Non-orthogonality represents the offset from a perfectly orthogonal inphase and quadrature components, i.e. ninety degrees.

The first step in the calibration/correction removes the demixer nonlinear effects. This step will be done individually for each receiver circuit. It is important to remove these effects in order to improve signal quality and improve the accuracy of the second stage calibration.

Nonlinear effects or impairments are modeled in FIG. 5(a) by 1010-1022. The inphase component of the carrier at 1010 is mixed or multiplied, by the mixer 1012, with the output of the circuit 1008. The quadrature component of the carrier at 1014 is mixed or multiplied, by the mixer 1016, with the output of the circuit 1008. The output of the mixer 1016 undergoes an I/Q time delay difference by the I/Q time delay difference circuit 1018 and the output of the circuit 1018 is provided as input to the Q gain offset circuit 1022 $A^Q$ of the circuit of the first stream. The output of the mixer 1012 is provided as input to the I gain offset circuit 1020 where $A^I/A^Q$ represents the gain mismatch between I and Q. The output of the circuits 1020 and 1022 are each provided to a respective ADC of the ADCs 1024, which, are typically located between the modules 102 and the block 106. The output of the ADCs 1024 are provided as input to a demixer I/Q nonlinearity calibration circuit 1026, which is essentially a combination of the block 106, block 110 and block 114. In FIG. 5(a), a RF circuit with group delay and phase effects 1040 includes the antenna 1002, the time delay circuit 1006 and the phase offset circuit 1008. The circuit 1040 provides input to a RF de-mixer circuit 1042, which includes the circuits 1012, 1016, 1018, 1020 and 1022.

The second stage measures and corrects the phase and delay variation across the antenna circuits (or streams), as illustrated in FIG. 5(b), which advantageously solve the reciprocity conditions.

To understand how these steps solve the reciprocity conditions, as represented in Eqs. 4 through 9, consider an example, corresponding to that which is illustrated in FIG. 5(b), where, without loss of generality, N is equal to three and the second receiver circuit, in the N stream of receivers, each responsive to an RF signal, is found to have the largest delay paramenter ($\tau 1$). Then, conceptually the other receiver circuits (0 and 2) can be compensated to match. In particular, the RF signals 0 and 1 can be phased by $\phi_1 - \phi_0$ and $\phi_1 - \phi_2$, respectively, to equalize the phases, and similarly, time shifted $\tau_1 - \tau_0$ and $\tau_2 - \tau_0$, respectively, to equalize the time delays, as depicted in FIG. 5(b).

More particularly, in FIG. 5(b), RF antennas 1050 through 1054, each receive RF signals 0, 1 and 2, respectively. The received signals are processed by the stream calibration circuit 1056, which is essentially a model of or represents the chains 354. More specifically, each of the three streams includes a time delay (group delay) circuit, a phase offset circuit and a calibrated baseband I/Q pair. The second of the three streams has the longest delay, as previously noted. Therefore, the first and third streams, after being processed by the circuit 1056, are provided to a phase correction circuit 1058, which is essentially a model of or represents the group of ξi circuits 358. This process involves mixing the output of the corresponding stream circuits of the circuit 1056 with a phase and providing the mixed output to a group correction circuit 1060, which corrects the delay for the first and third streams. The circuit 1060 is a model of or represents the resamplers 362. The output of the circuit 1060 is then provided to the MIMO demodulation and decoding circuit for demodulation and decoding processing.

As a result of this two step calibration sequence, the elements of Eq. 6 are satisfied. For example, if this method is applied to the receiver at STA A in FIG. 5, the resulting reciprocity condition would be expressed as:

$$K_{AR}A_{RX} = a_{AR}I = e^{j(\tau 1\omega + \phi 1)}I \qquad \text{Eq. (9a)}$$

so that $$a_{AR} = e^{j(\tau 1\omega + \phi 1)} \qquad \text{Eq. (9b)}$$

where I is the 3×3 identity matrix.

For the transmitter calibration at STA A (station A), in FIG. 5, the calibration is done in a similar way. For the transmitter, the calibration reference signals are generated locally within the transmitter, passed through to the RF circuit and collected in an external device, such as the a compensation parameter calculation block 172. The parameters are estimated in the same way as the receiver and passed back to the transmitter compensation modules, the group of modules 118-124. For example, assuming the third RF circuit to have the largest delay, the reciprocity constant is:

$$a_{AT} = e^{j(\tau 2\omega + \phi 2)} \qquad \text{Eq. 9(c)}$$

It is important to note that this calibration can be done locally at both stations, i.e. Stations A and B, for both the transmitter and receiver circuits. By so doing, Eq. 9 is satisfied, with each individual coefficient of the form in Eq. (9b). Thus, the calibration of both the transmitter RF and mixer circuits and receiver RF and demixer circuits are equally important.

The circuits of FIG. 6 and FIG. 10 are examples of implementations that will achieve the two-step calibration described herein, but obvious variations are anticipated, for example, by changing the order of the individual circuit components.

FIG. 6 shows a step 1 calibration module 300, in accordance with an embodiment of the present invention. The module 300 is shown to include an RF calibration reference source 250 (or calibration sequences 156) shown coupled to a receiver analog circuit 252, which is in turn shown coupled to a step 1 calibration circuit.

The receiver analog circuit 252 is shown to include an RF module 256 (or modules 102) and an in-phase analog-to-digital converter (ADC) 258 and a quadrature ADC 260. The step 1 calibration circuit 254 is shown to include an in-phase beta circuit 266 coupled to an in-phase gamma circuit 270 and an in-phase summer 274, which is shown coupled to an in-phase resampler 278. The circuit 254 is further shown to include a quadrature alpha circuit 264 coupled to a quadrature summer 276, which is shown coupled to a quadrature resampler 280. The circuit 254 is further shown to include a gain correction calculation 262 coupled to receive a digital in-phase signal 290 and a digital quadrature signal 292. The signal 290 is also coupled to serve as the circuit's 266 input and the signal 292 is coupled to serve as the circuit's 264 input. The circuit 254 also includes an orthogonality correction calculation circuit 268 coupled to receive an output generated by the circuit 266 and an output generated by the circuit 264 and to generate a gamma over two output 298, which operates on both the output of the circuit 266 and the output of the circuit 264 prior to their being provided to the summers 274 and 276, respectively, and in a manner consistent with the equations to follow.

In the circuit 252, the module 256 is shown to receive the output of an RF calibration reference source 250 and to generate an analog in-phase signal 294 and an analog quadrature signal 296. The RF module 256 converts an RF signal, i.e. the output of the RF calibration reference source 250 to baseband. The signal 294 is provided to the ADC 258 for conversion to digital form. Similarly, the signal 296 is provided to the ADC 260 for conversion to digital form.

The output of the resamplers 278 and 282 are the calibrated IQ chain 1 and are provided to a step 2 calibration circuit, as will be evident shortly. The circuit 262 is similar to the gain correction block 106 of FIG. 3 and serves to correct the gain offset between the in-phase and quadrature parts of the received baseband signal.

The sequence of calibration measurements and compensations is ordered so that the IQ gain offset is measured and compensated first. For the gain offset measurement, a broad band RF signal is injected, by the source 250, as the input to the RF module 256. The RF module 256 then converts the injected signal to a baseband signal (or an equivalent IF, depending on the implementation), having I and Q components to generate the signals 294 and 296. Ideally, the signals 290 and 292, which are generated from the signals 294 and 296, respectively, will have equal power, but there will be differences due to effects such as ADC, RF amplifier and circuit gain mismatches. The power of the signals 290 and 292 are estimated by averaging over a sufficiently long sequence of sampled values of I and Q of the ADC:

$$I_{POW} = \frac{1}{L}\sum_{n=1}^{L} I_n^2 \quad \text{Eq. (10)}$$

$$Q_{POW} = \frac{1}{L}\sum_{n=1}^{L} Q_n^2 \quad \text{Eq. (11)}$$

In Eqs. (10) and (11), $I_{POW}$ and $Q_{POW}$ are the estimated power levels on the I 290 and Q 292 receiver path.

$$\sum_{n=1}^{L} I_n^2$$

represents summation of I over N−1 to L samples or Q over N−1 to L samples, depending on whether it is used in Eq. (10) or Eq. (11). Further, L is an integer sufficiently large enough to ensure accurate power measurement, and k is the index of the I 290 and Q 292 signals during the time period of the measurement. The gain adjustment values are calculated by comparing the measured powers to a target power level P $$\alpha = \frac{P}{\sqrt{I_{POW}}} \quad \text{Eq. (12)}$$

$$\beta = \frac{P}{\sqrt{Q_{POW}}} \quad \text{Eq. (13)}$$

The alpha in Eq. (12) represents the function performed by the circuit 266 and the beta in Eq. (13) represents the function performed by the circuit 266. The gain adjustments are then implemented as gain blocks, as shown in FIG. 6. √ represents the square root operation.

The block 268 performs a non-orthogonality correction on I and Q after a gain offset correction has been made, this is done in accordance with the following equation:

$$\gamma = \frac{1}{L}\sum_{n=1}^{L} I_n \times Q_n \quad \text{Eq. (14)}$$

Ideally, if I and Q or the signals 290 and 292 are orthogonal, the average of the product of I and Q should be zero. Any non-orthogonality will result in correlation between the two branches, and a non-zero average. The measured value γ is proportional to the non-orthogonality, and can be used to cancel the cross-correlation between I and Q, as shown in FIG. 6. In Eq. (13), the integer value L is chosen large enough to ensure an accurate measure of the non-orthogonality, and will depend on the relative noise present during the calibration. The non-orthogonality is corrected by multiplying the signal output of the gain correction multipliers, circuits 266 and 264, by the one-half measured non-orthogonality constant g, using the multiplier circuits 270 and 272. The output of the Q multiplier circuit 272 is then subtracted from the I signal using the subtraction module 274. Similarly, the output of the I multiplier circuit 270 is subtracted from the Q path using the subtractor 276.

After the signals 290 and 292 have been gain equalized and corrected for non-orthogonality, the group delay, by the block 282, between the two signals is measured and corrected. In one embodiment of the present of the present invention, this is done using an FFT module, a hardware block common to OFDM transceivers. A test sequence is fed into the signals 290 and 292 that have a reference signal on each of the FFT tones. The phase of the I and Q outputs of the FFT is measured at each tone, as shown in FIG. 7, and the phase is recorded and stored. If the phase is plotted versus subcarrier number, the slope of the phase curve is proportional to the group delay in the respective I and Q branches. If there is a group delay mismatch, then the slopes of the I and Q phase curves will differ, as depicted in FIGS. 8 and 9. The group delay mismatch that needs to be compensated is proportional to the slope of the difference curve $\delta\theta = \theta_Q - \theta_I$, as shown in FIG. 9

FIG. 7 shows an exemplary group delay calculation block 304, in accordance with an embodiment of the present invention. In FIG. 7, a gain and orthogonality correction modules 302 is shown coupled to generate an in-phase signal 306 and a quadrature signal 308. The signal 306 is shown coupled to an in-phase FFT circuit 310 and the signal 308 is shown coupled to a quadrature FFT circuit 312. Both circuits 312 and 310 are included in the circuit 304. The modules 302 are made of circuits similar to that which comprises the circuit 254, in FIG. 6, except for the circuit 282 and the resamplers 278 and 280. The gain and orthogonality corrections, done by the modules 302 and that which is described above, is done in the time domain. Each of the circuits 310 and 312 perform an NFFT point FFT as there are NFFT frequency points to measure the group delay error between the I and Q paths. In the embodiment of FIG. 7, group delay is calculated in frequency domain. In an alternative embodiment group delay is calculated in time domain, as shown relative to a subsequent figure herein.

FIG. 8 shows a graph of the phase delay between I and Q with the y-axis representing the phase $\theta_I$ or $\theta_Q$, which is proportional to the group delay on the I and Q paths, respectively. The x-axis represents k, which is the index of the of the sub-carrier used for the group delay measurement, in the frequency domain. During this measurement, the same signal, in the time domain, is processed through the gain and orthogonality correction circuit 302, and is the output of the summation circuits 274 and 276, as part of the first step of the calibration process. FIG. 9 shows a graph, for the first stage group delay calibration process, of the difference in phases of the I and Q signals with the y-axis representing relative phase by the following equation:

$$\delta\theta = \theta_Q - \theta_I \qquad \text{Eq (15)}$$

and the x-axis representing the sub-carriers index k.

Thus, after calibration of IQ gain and non-orthogonality in this first step of the calibration process, there still remains a phase offset, that varies linearly with subcarrier number, and is proportional to the group delay mismatch between each I and Q pair. Following the IQ gain and non-orthogonality calibration, this IQ group delay offset is subsequently measured using a calibration process that is further explained shortly.

The group delay compensation is estimated by first making a linear approximation to the phase difference curve or the graph of FIG. 9. One such method reducing the effects of measurement noise is the least squares curve fitting method. In this method a linear model is assumed and the equation is:

$$y = mx + b \qquad \text{Eq. (16)}$$

and the slope m need be determined for the group delay compensation. The joint solution for m and b is given as:

$$\begin{bmatrix} m \\ b \end{bmatrix} = (K^T K)^{-1} K^T \delta\theta \qquad \text{Eq. (17)}$$

where $\delta\theta$ is the measured phase difference vector, as shown in FIG. 9, at the subcarriers, numbered $k = -N/2, -N/2+1, \ldots, N/2-1$,
and K is the N×2 matrix:

$$K = \begin{bmatrix} -N/2 & 1 \\ -N/2+1 & 1 \\ \vdots & \vdots \\ N/2 & 1 \end{bmatrix}. \qquad \text{Eq. (18)}$$

In Eq. (18), the matrix $(K^T K)^{-1} K^T$ is pre-stored for the calculation. The estimate of m is proportional to the group delay difference between I and Q. The estimated m is converted to equivalent fractional delay in samples, and this delay is applied to the branch that has the least delay. That is, the leading branch is delayed so that the group delay on the I and Q branches are equal. This is commonly done with a resampler.

For example, a typical calculation might yield m=-5°/subcarrier. Since it is negative, there is more delay in the I channel than the Q channel. Thus, some delay needs to be added to the Q channel. The question is how much delay needs to be added. In an example where there are 64 sub-carriers, that would mean 5×32=160° at the outermost carrier, which translates to $$\frac{160}{180} = 0.89$$

samples of delay needed. In this case, the resampler 280 of FIG. 6 provides the delay, while the resampler 278 is bypassed. Fractions of a sample delay are added using standard digital resampler circuits.

The foregoing calibration approach uses an external source to calibrate the I/Q channels. In another embodiment of the present invention, the same effective compensation can also be achieved using a loop-back calibration without the need for an external source.

Now, the second part of the calibration process is described relative to a step 2 calibration circuit. The second part of calibration compensates, or aligns the individual receiver and transmitter streams, after they have been calibrated as described in the step 1 of the calibration process. This extra step is necessary because, although each of the individual streams has been calibrated, there remains no guarantee that the streams are calibrated with respect to each other. Specifically, the phase and group delay variation across the streams (or with respect to the different streams) must be calibrated. One such approach is depicted in FIG. 10.

FIG. 10 shows a step 2 calibration circuit 350 coupled to a group of N calibrated IQ chains 354, which are shown to receive their input from an RF calibration reference source 352. Each of the group of chains 354 is a calibrated IQ chain 1. For example, the first calibrated IQ chain 1 in the group of chains 354 receives its input from the calibrated IQ chain 1, as generated by the resamplers 278 and 280. Thus, the output of the first part of the calibration process is provided as input to the second part of the calibration process. The output of the group of calibrated chains 354 is provided as input to the circuit 350, which includes a step 2 group delay and phase calculation circuit 366 responsive to the output of the group of chains 354 and a group of ξi circuits 358 with each ξi circuit therein being responsive to a corresponding output of a calibrated IQ chain from the group of chains 354. The output of the group of ξi circuits 358 is provided as input to a group of resamplers 362, which provide fully calibrated MIMO signals.

The circuit 366 performs phase correction across the IQ pairs of signals and another group delay operation. The phase correction performed is similar to that noted, for example, relative to the circuit 110.

After the I and Q signals are calibrated, the group delay and phase differences between the N receive/transmit chains branches is measured and corrected using an FFT block, in the same way as was done by the Step 1 calibration circuit. While this is presented relative to a receiver, a similar approach is applied to a transmitter.

The calibration parameters, ξ1, ξ2, ..., ξN and the delay parameters are computed using circuit 366 which is shown in detail in FIG. 11. FIG. 11 shows the circuit 366 implemented using N FFT circuits, such as the FFT circuits 370 and 371. The input to the circuits 370 and 371 are provided by the calibrated IQ chain of the group of chains 354. Each FFT block performs an N-point FFT as there are N sub-carriers.

Phase and delay parameters across streams are computed in much the same as was done for the I/Q calibration. This measurement uses the FFT circuit as well, but in this case the outputs from the calibrated signal modules, shown in FIG. 11, are complex. The complex output from the FFT modules are converted to phase and used to compute the slope m and zero-frequency (DC) intercept b, as before, using the linear estimator:

$$\begin{bmatrix} m \\ b \end{bmatrix} = (K^T K)^{-1} K^T \delta\theta. \qquad \text{Eq. (19)}$$

In this case, because the inputs are complex, the phase at the origin of the figures does not necessarily pass through the origin, as is the case for real inputs (I and Q separately) in Step 1. The estimated phase at the origin, $b_1, b_2, \ldots, b_N$, needs to be compensated (or removed) across streams. This can be done using the phasors:

$$\xi_1 = e^{-jb1}$$
$$\xi_2 = e^{-jb2}$$
$$\vdots$$
$$\xi_N = e^{-jbN},$$

which are implemented as complex multipliers, as shown in FIG. 10. FIG. 12 shows a graph of the phase for the complex signals for each receiver chain as part of the second part of the calibration process and FIG. 13 shows a graph of the difference in the phase between the different chains, for the second part of the calibration process.

The group delay across streams, or chains is compensated in same way the IQ group delay was corrected. That is, the branch with the longest delay is found by comparing all the measured slopes $m_1, m_2, \ldots, m_N$, as given by Eq. (18), and the differences between the remaining branches having shorter delay is calculated. These differences are converted to fractions of a sample and implemented using a resampler, as shown in FIG. 10, so that the group delay across each of the streams is equalized.

If a delay difference is found to exceed one whole sample, then pure one-sample delays are used in conjunction with the fractional delay to make up the difference.

The FFT circuits of the circuit 366 are each a convenient FFT for estimating group delay, but are not required to implement this calibration scheme, rather they are optional. Instead, pure tones at discrete frequency points can be used sequentially to build up the phase measurement vectors. This approach can be implemented entirely in the time-domain and have the advantage of simplicity. This alternate approach is detailed below.

In another embodiment, the resampler circuits from the two stages may be combined into a single resampler, combining the total measured delays, for added simplicity. For example, the resamplers 362 and that of the circuit 254 may be combined into one resampler.

The overall structure for the calibration circuit after all the step 1 and step 2 parameters are estimated is shown in FIG. 14.

In FIG. 14, a calibration system 400, employed in a MIMO system, is shown to include a group of RF antennas 402 coupled to provide input to a group of step 1 calibration circuits 404, which in turn provide input to a group of step 2 calibration circuit 406, which generate fully calibrated streams to be processed by a MIMO receiver signal processor block 408. Each of the groups shown in FIG. 14 includes N number of devices wherein N represents the number of receivers. M represents the number of transmitters or transmitter devices. The small k notation is used to represent an index in the FFT output. The group of circuits 404 include circuits such as the circuit 254 of FIG. 6 and group of circuits 406 include circuits such as the circuit 350 of FIG. 10.

For a transmitter, rather than the receiver of FIG. 14, the arrows in FIG. 14 would be reversed in direction, and the calibration processing described above would be done in a separate unit, either an RF data collection system, or a calibrated RF/Baseband module. The parameters would be loaded from the remote processor for subsequent calibrated Tx beamforming, as described by the interaction between modules 172 and 166 in FIG. 4.

In an exemplary application, the embodiments shown and discussed herein are employed in a system using OFDM. The various embodiments show calibration for beamforming, which is, in particular, done for implicit beamforming.

FIG. 15 shows time domain calibration for phase and group delay across receiver sub-carrier circuits. In FIG. 15, a time domain phase and group delay calibration system 500 is shown coupled to an external RF source 501 that provides an RF signal to the system 500, which is used for calibration of the system 500.

The system 500 is shown to include a group of RF/ADC blocks 504 coupled to a group of IQ calibration modules 506, each of said group includes three blocks or modules but any other number thereof may be employed. The modules 506 are shown coupled to a cross correlate circuit 508 and a cross correlate circuit 510. More specifically, the first and second of the modules 506 are shown coupled to the circuit 508 and the second and third of the modules 506 are shown coupled to the circuit 510. The output of the circuit 508 is shown coupled to an accumulator circuit 512 and the output of the circuit 510 is shown coupled to the accumulator circuit 514. The look-up-table (LUT) 516 is shown coupled to the circuit 512 and the LUT 518 is shown coupled to the circuit 514. The output of the LUTs 516 and 518 are shown to provide input to an estimate parameters circuit 520. The system 500 is shown to include the blocks 504, the modules 506, the circuit 508, 510, 512, 514, the LUTs 516 and 518 and the circuit 520, in accordance with an embodiment of the present invention.

In operation, the system 500, which operates in the time domain, serves to determine the group delay and phase compensation parameters in the time domain. To do so, a sinusoidal reference source, in analog form, is provided by the source 501 and converted to digital form by the blocks 504. The converted signals are transformed in I and Q form, as previously described, by the modules 506. These signals can be represented by:

$$s_0 = e^{j((w_r + w_c)t + \theta_0)}$$
$$s_1 = e^{j((w_r + w_c)t + \theta_1)}$$
$$s_2 = e^{j((w_r + w_c)t + \theta_2)}$$

where $w_r$ is the sinusoidal reference frequency, wc is any carrier offset and $\theta_0, \theta_1$ and $\theta_2$ are the phases of the individual signals. The output of the modules 506 are then cross-correlated, on a pair basis, to generate cross correlated IQ signals by the circuits 508 and 510, for use by the circuits 512 and 514. The cross-correlated signals can be written as $$s_0 \times s^*_1 = \theta_0 - \theta_1 = \delta\theta_{01}$$

$$s_1 \times s^*_2 = \theta_1 - \theta_2 = \delta\theta_{12}$$

The circuit 512 accumulates the output $\delta\theta_{01}$ of the circuit 508 and the circuit 514 accumulates the output $\delta\theta_{12}$ of the circuit 510. The angle of each of the accumulated signals is proportional to the phase thereof at the particular frequency of the reference signal provided by the source 501. The circuits 512 and 514 each accumulate the signals for a long enough period of time to reduce any noise affects on measuring the angles. The LUTs 516 and 518 each are tables used to determine the real valued angles corresponding to the resulting accumulation of $\delta\theta_{01}$ and $\delta\theta_{12}$. Similarly, a CORDIC module, or a numerical arc-tangent function, may be used to calculate the corresponding phase of the accumulated complex values.

The angle may be computed at evenly spaced frequencies spanning the signal bandwidth, for example, −6, −2, +2 and +6 MHz for a 20 MHz OFDM signal and stored in vector form. Using the embodiment of FIG. 15, the relative phase is computed directly and only two simply designed correlators, i.e. circuits 508 and 510, are required, instead of three individual FFT circuits, as in the case of the frequency domain approach. Plotted linearly against frequency, the slope of the $\delta\theta_{01}$ curve will be proportional to the group delay between the 0 and 1 chains, while the phase is proportional to the phase offset at zero frequency, depicted as $b_{01}$ in FIG. 16. The corresponding phase and group delay offsets can be found using the results of the $\delta\theta_{12}$ measurements. As before, the phase and group delay parameters can be estimated jointly by using the same estimator:

$$\begin{bmatrix} m \\ b \end{bmatrix} = (K^T K)^{-1} K^T \delta\theta \qquad \text{Eq. (20)}$$

where $$K = \begin{bmatrix} -6 & 1 \\ -2 & 1 \\ +2 & 1 \\ +6 & 1 \end{bmatrix} \qquad \text{Eq. (21)}$$

has entries corresponding to the frequency points at which the angles were measured.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A universal multi-input-multi-output (MIMO) beamforming system for receiving a plurality of streams comprising:
a calibration system including,
a first calibration circuit responsive to inphase (I) and quadrature (Q) pairs of streams and operative to calibrate each I and Q pair, the first calibration circuit responsive to a first, second and third streams, each of the first, second and third streams having a group delay associated therewith, the second stream having the longest group delay out of the first, second and third streams, the first calibration circuit including a plurality of group delay circuits and a plurality of phase offset circuits, each of the first, second and third streams being processed by a unique one of the plurality of group delay circuits and a unique one of the phase offset circuits and the group delay circuit for processing the first stream is operative to compensate for the group delay of the first stream, the compensated first stream processed by one of the phase offset circuits, and the group delay circuit for processing the second stream is operative to compensate for the group delay of the second stream, the compensated second stream processed by one of the phase offset circuits, and the group delay circuit for processing the third stream is operative to compensate for the group delay of the third stream, the first calibration circuit operative to generate a calibrated I/Q pair for each of the first, second and third streams; and
a second calibration circuit responsive to the calibrated first and third calibrated I/Q pairs and including a plurality of phase correction circuits and a plurality of group correction circuits, a unique phase correction circuit for each of the first and third streams and a unique group correction circuit for each of the first and third streams, the phase correction circuit for mixing a corresponding calibrated I/Q pair with a phase and providing the mixed output to the corresponding group correction circuit, each of the group correction circuits operative to correct the delay of the first and third streams for demodulation and decoding, the first, second and third calibrated streams are output "after phrase" operative to correct the delay of the first and third streams.

2. A calibration system, as recited in claim 1, wherein the first calibration circuit includes N group delay circuits, wherein 'N' is an integer representing the number of streams.

3. A calibration system, as recited in claim 2, wherein the first calibration circuit is coupled to receive the streams from a plurality of receivers that is responsive to the output of a plurality of transmitters, the first calibration circuit being operative to equalize the overall phase between each transmitter and receiver channel.

4. A calibration system, as recited in claim 1, wherein the second calibration circuit is further operative to use fast frequency transform (FFT) to perform time domain to frequency domain translation.

5. A calibration system, as recited in claim 1, wherein the calibration system is operative to receive an orthogonal frequency domain multiplexing (OFDM) signal, in packets, and operative to verify that the received OFDM signal is OFDM and further operative to verify that the signal has been properly received.

6. A calibration system, as recited in claim 1, wherein the second calibrated I/Q pair is provided by the first calibration circuit for demodulation and decoding.

* * * * *